(12) United States Patent
Scholtz et al.

(10) Patent No.: US 11,255,727 B2
(45) Date of Patent: *Feb. 22, 2022

(54) NANOSTRUCTURE BASED ARTICLE, OPTICAL SENSOR AND ANALYTICAL INSTRUMENT AND METHOD OF FORMING SAME

(71) Applicant: Chromation Inc., New York, NY (US)

(72) Inventors: James Scholtz, Jamesport, NY (US); Nadia Pervez, Houston, TX (US); Ioannis Kymissis, New York, NY (US); Michael Gazes, Forest Hills, NY (US); Tanya Cruz Garza, New York, NY (US)

(73) Assignee: Chromation Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,554

(22) Filed: May 14, 2020

(65) Prior Publication Data

US 2020/0278249 A1 Sep. 3, 2020

Related U.S. Application Data

(63) Continuation of application No. 15/764,692, filed as application No. PCT/US2016/053925 on Sep. 27, 2016, now Pat. No. 10,656,013.

(Continued)

(51) Int. Cl.
*G01J 3/28* (2006.01)
*G01J 3/42* (2006.01)
(Continued)

(52) U.S. Cl.
CPC ........... *G01J 3/0256* (2013.01); *G01J 3/0232* (2013.01); *G01J 3/0262* (2013.01); *G01J 3/1838* (2013.01); *G01J 3/2803* (2013.01); *G01J 3/42* (2013.01)

(58) Field of Classification Search
CPC .......... G01J 3/0256; G01J 3/42; G01J 3/0232; G01J 3/0262; G01J 3/1838; G01J 3/2803
See application file for complete search history.

(56) References Cited

U.S. PATENT DOCUMENTS 5,121,030 A 6/1992 Schott
5,214,736 A 5/1993 Uemiya et al.
(Continued)

FOREIGN PATENT DOCUMENTS

DE 102010040768 A1 3/2012
EP 2887119 A1 6/2015
(Continued)

OTHER PUBLICATIONS

International Preliminary Report on Patentability for PCT/US2017/032005, dated Nov. 22, 2018, 8 pages.
(Continued)

*Primary Examiner* — Hina F Ayub
(74) *Attorney, Agent, or Firm* — Cozen O'Connor

(57) ABSTRACT

An apparatus includes a substrate transmissive of electromagnetic energy of at least a plurality of wavelengths, having a first end, a second end, a first major face, a second major face, at least one edge, a length, a width, and a thickness, at least a first nanostructure that selectively extracts electromagnetic energy of a first set of wavelengths from the substrate; and an input optic oriented and positioned to provide electromagnetic energy into the substrate via at least one of the first or the second major face of the substrate. Nanostructures can take the form of photonic crystal arrays, a plasmonic structure arrays, or holographic diffraction gratings. The apparatus may be part of a spectrometer.

21 Claims, 9 Drawing Sheets

Related U.S. Application Data

(60) Provisional application No. 62/234,315, filed on Sep. 29, 2015.

(51) Int. Cl.
  *G01J 3/02* (2006.01)
  *G01J 3/18* (2006.01)

(56) References Cited

U.S. PATENT DOCUMENTS

| | | |
|---|---|---|
| 6,507,709 B2 | 1/2003 | Hirai et al. |
| 6,738,551 B2 | 5/2004 | Noda et al. |
| 6,879,451 B1 | 4/2005 | Hewlett et al. |
| 7,065,280 B2 | 6/2006 | Ogawa et al. |
| 7,092,101 B2 | 8/2006 | Brady et al. |
| 7,145,614 B2 | 12/2006 | Lee et al. |
| 7,274,458 B2 | 9/2007 | Perez et al. |
| 7,768,640 B2 | 8/2010 | Cunningham et al. |
| 8,854,624 B2 | 10/2014 | Pervez et al. |
| 2004/0007662 A1 | 1/2004 | Sidorin |
| 2006/0017928 A1 | 1/2006 | Crowther |
| 2008/0224121 A1 | 9/2008 | Bose et al. |
| 2008/0246961 A1 | 10/2008 | Zhang et al. |
| 2008/0258160 A1* | 10/2008 | Do ................ H01L 33/508 257/98 |
| 2013/0314704 A1 | 11/2013 | Ko |
| 2014/0002820 A1 | 1/2014 | Ko |
| 2014/0021334 A1 | 1/2014 | Velner et al. |
| 2014/0140655 A1 | 5/2014 | Chakravarty et al. |
| 2018/0003558 A1 | 1/2018 | Goldring et al. |

FOREIGN PATENT DOCUMENTS

| | | |
|---|---|---|
| WO | 2011046875 A1 | 4/2011 |
| WO | 2012057792 A1 | 5/2012 |
| WO | 2012088117 A1 | 6/2012 |
| WO | 2013102661 A1 | 7/2013 |
| WO | 2013158842 A1 | 10/2013 |
| WO | 2015112169 A1 | 7/2015 |

OTHER PUBLICATIONS

International Search Report for PCT/US2017/032005, dated Aug. 21, 2017, 4 pages.
International Search Report, dated Mar. 27, 2017, for PCT/US2016/053925, 6 pages.
Written Opinion for PCT/US2017/032005, dated Aug. 21, 2017, 6 pages.
Written Opinion, dated Mar. 27, 2017, for PCT/US2016/053925, 8 pages.
European Search Report dated Apr. 15, 2021 for corresponding EP Application No. 16785586.5, dated Apr. 15, 2021, 12 pages.
Goldman, Don P., et al., "Miniaturized spectrometer employing planar waveguides and grating couplers for chemical analysis", Applied Optics, Optical Society of America, vol. 29, Mo. 31, Nov. 1, 1990, pp. 4583-4569.

* cited by examiner

NANOSTRUCTURE BASED ARTICLE, OPTICAL SENSOR AND ANALYTICAL INSTRUMENT AND METHOD OF FORMING SAME

STATEMENT OF GOVERNMENT INTEREST

This invention was made with government support under Grant Number IIP-1152707 awarded by the National Science Foundation. The government has certain rights in this invention.

BACKGROUND

Technical Field

The present disclosure relates generally to nanostructure based optical sensors and analytical instruments, for example, spectrometers.

Description of the Related Art

Spectrometers are analytical instruments that are able to identify the wavelengths that comprise incident electromagnetic energy (e.g., light), and provide spectral content information or data that characterizes the constituent components of the incident electromagnetic energy. Spectrometers are useful in a large variety of settings and applications. One type of conventional spectrometer typically employs one or more diffraction gratings to spatially separate the wavelengths comprising the incident electromagnetic energy, which wavelengths are then detected by a suitable sensor or detector (e.g., linear sensor or linear detector), the position of the spatially resolved electromagnetic energy on the sensor or detector being indicative of the respective wavelengths. Spectral resolution has been a function of distance between the diffraction grating and the sensor or detector. This disadvantageously means that the physical dimensions of the spectrometer must be relatively large in order to obtain high spectral resolution.

Photonic crystals have been suggested for use in spatially resolving the wavelengths in incident light. Photonic crystals can generally be employed in three ways. For example, as photonic bandgap structures localize or guide light of certain wavelength ranges in defects because the wavelength range is gapped in the structure (allowed only in the defects). Also for example, as super prisms having enhanced diffraction like properties, allowing a stronger prism effect to be achieved from a given material than might otherwise be possible from that material. As a further example, as scattering structures, which do not have to be as strong as photonic bandgap structures, and in which periodicity is used to intentionally scatter between states of system.

U.S. Pat. No. 8,854,624 generally describes a photonic crystal based spectrometer. U.S. Pat. No. 8,854,624 is an example of use of photonic crystals as scattering structures, and describes scattering from guided modes to free-space propagating modes. The photonic crystal based spectrometer includes a photonic crystal coupled to an outer surface of an optical waveguide to extract a portion of optical energy propagating through the waveguide via the photonic crystal. The photonic crystal comprises a first surface including a first array of periodic features on or with a dielectric material, the first array extending in at least two dimensions and having an effective dielectric permittivity different from that of dielectric material that surrounds the photonic crystal. The periodic features of the photonic crystal are characterized by a specified lattice constant, which at least in part determines the portion of propagating optical energy that will be extracted.

U.S. Pat. No. 8,854,624 illustrates and describes the waveguide as a planar or rectangular waveguide. To achieve propagation (i.e., transmission along a length of the waveguide via total internal reflection for electromagnetic energy entering the waveguide at angles greater than a critical angle for the waveguide), U.S. Pat. No. 8,854,624 teaches injecting the optical energy into the waveguide via an edge of the waveguide. For a planar waveguide, the edge is a minor face or minor boundary of the waveguide characterized by a minor dimension (i.e., thickness), as compared to major faces which are characterized by two major dimensions (i.e., length and width). This edge injection is typically considered necessary since, for planar waveguides, it is the major faces which offer total internal reflection, for instance due to the placement of cladding on or at those major faces.

BRIEF SUMMARY

Advantageously, an article can employ input optics and/or output optics to facilitate entry of electromagnetic energy (e.g., light including visible, infrared and/or ultraviolet ranges) into an electromagnetic energy transmissive structure, such as a substrate (e.g., optically transmissive substrate, optical waveguide, planar waveguide), slab or layer, via a major face thereof and/or to facilitate extraction or exiting of electromagnetic energy out of the electromagnetic energy transmissive structure. Entry of electromagnetic energy via a major face of the substrate, slab or layer provides a variety of benefits, such as, for example, use of one or more input optics to facilitate or otherwise cause electromagnetic energy to enter the substrate, slab or layer via a major face of the substrate, slab or layer, which is typically smoother or more easily polished than an edge of the substrate, slab or layer. Such may eliminate the need to have highly smooth edges and/or eliminate the need to polish the edges of a substrate, slab or layer or at least reduce the degree to which the edge needs to be polished. Employing input optics to cause electromagnetic energy to enter via a major face may also allow a significant increase in dimensions of an area or region into which electromagnetic energy may be coupled into the substrate, slab or layer. Typically any given edge of a substrate, slab or layer will have relatively much smaller dimensional area as compared to a major face. For non-circular substrates, slabs or layers, the dimensional area of an edge is typically given by the length times the thickness, or by the width times the thickness, where the thickness is the smaller dimension of the three dimensions, length, width and thickness, noting that the length and width may be equal to one another for square substrates, slabs or layers. Employing input optics to cause electromagnetic energy to enter via a major face may also advantageously avoid the need to physically and/or optically couple to an edge, thereby omitting complicated structures that might otherwise be required. This reduces complexity and cost, and may also allow a significant reduction in package size.

An article can employ various types of nanostructures or regions of nanostructures as input optics and/or output optics, to respectively facilitate entry of electromagnetic energy respectively into and out of an electromagnetic energy transmissive structure such as a substrate, slab or layer. Additionally or alternatively, an article can employ a variety of other types of input optics, for example, mirrors or reflectors, prisms, focusing optics or lenses, and/or reflective or refractive surfaces to couple electromagnetic energy into the substrate.

Nanostructures can provide periodic structures with dimensions on the scale of nanometers and which can interact with electromagnetic energy, for instance light, in a manner that is characterized by the structural characteristics of the array, e.g., a lattice constant of the array or portion thereof. The nanostructures or regions of nanostructures can include photonic crystals, for instance an ordered two-dimensional or three-dimensional array or lattice of photonic crystals. The nanostructures or regions of nanostructures can include plasmonic nanostructures, for instance an ordered two-dimensional or three-dimensional array or lattice of plasmonic nanostructures. The nanostructures or regions of nanostructures can include holographic diffraction nanostructures, for instance an ordered two-dimensional or three-dimensional array or lattice of holographic diffraction nanostructures.

The substrate, slab or layer can, for example, take the form of a plane, slab or layer of electromagnetic energy transmissive material (e.g., optically transmissive material). The plane, slab or layer of transmissive material can be generally transmissive of electromagnetic energy of at least certain wavelengths or frequencies of interest (i.e., wavelengths or frequencies to be detected or sensed, e.g., light including visible, infrared and/or ultraviolet ranges), without any propensity to guide the electromagnetic energy (i.e., transmissive without total internal reflection). Alternatively, the plane, slab or layer of transmissive material can be a planar waveguide, which propagates (i.e., waveguides) electromagnetic energy of at least certain wavelengths or frequencies of interest, generally along at least one axis (e.g., along a major axis of the substrate) with total internal reflection for electromagnetic energy which enters at or greater than a critical angle for the substrate, slab or layer.

Nanostructures formed in or on the substrate, slab or layer or otherwise optically coupled to the substrate, slab or layer can cause specific wavelength components of the electromagnetic energy to exit (e.g., be extracted from) the substrate, slab or layer. This approach can be employed to spatially resolve the components of the electromagnetic energy, which can be detected or sensed by a detector or sensor, and converted into information (e.g., raw information in analog or digital form) that is representative of wavelength distribution in the incident light.

Scattering by the nanostructure alters the direction of propagation. This contrasts with most filters, which generally do not alter the direction of propagation.

An apparatus may be summarized as including: a substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate; at least a first nanostructure that selectively extracts electromagnetic energy of a first set of wavelengths from the substrate; and an input optic oriented and positioned to provide electromagnetic energy into the substrate via at least one of the first or the second major face of the substrate.

The length may be greater than or equal to the width and the thickness may be less than the length and less than the width. The first nanostructure may selectively extract electromagnetic energy of the first set of wavelengths from the substrate via the first major face of the substrate. The apparatus may further include: a second nanostructure that selectively extracts electromagnetic energy of a second set of wavelengths from the substrate via the first major face of the substrate, the second set of wavelengths different from the first set of wavelengths. The second set of wavelengths may be exclusive of the first set of wavelengths. The first nanostructure may include one of a first photonic crystal lattice or a plasmonic structure in a dielectric. The apparatus may further include: a second nanostructure in the dielectric that selectively extracts electromagnetic energy of a second set of wavelengths from the substrate via the first major face of the substrate, the second set of wavelengths different from the first set of wavelengths. The dielectric may overlie the first major face of the substrate. The dielectric may include the substrate, the first nanostructure and the second nanostructure residing in the first major surface. The first nanostructure may be one of a first photonic crystal lattice or a first plasmonic structure. The apparatus may further include: a light sensor positioned to receive light extracted from the substrate at least by the first nanostructure and the second nanostructure. The apparatus may further include: a light sensor positioned to receive light extracted from the substrate at least by the first nanostructure. At least one of the first or the second major surfaces may be planar optically polished surfaces. The length may be a longest dimension of the substrate and the thickness may be a smallest dimension of the substrate along an axis that is perpendicular to the length and the width of the substrate. The first major face of the substrate may be parallel to the second major face of the substrate. The substrate may be a rectangular slab, that has four edges, the edges of a first pair of the four edges at respective ones of the ends of the substrate, and the edges of a second pair of the four edges at respective ones of a pair of sides of the substrate, the pair of sides opposed to one another across a width of the substrate. The input optic may be oriented and positioned to provide electromagnetic energy into the substrate in an area on the first or the second major face of the substrate which is greater than an area of at least one of the edges of the substrate. The substrate may be one of an optical waveguide or an optical light pipe. The input optic may be selected from the group consisting of a focusing lens, an array of focusing lenses, a prism, an array of prisms, a mirror, an array of mirrors, a reflector, a reflective surface, a reflective boundary, a refractive boundary, an input aperture, and a nanostructure. The substrate may form an integral cover glass of the sensor. The input optic may be oriented and positioned to provide electromagnetic energy into the substrate solely via at least one of the first or the second major face of the substrate, and not via the at least one edge of the substrate. The input optic may be physically directly coupled with one of the first or the second major face of the substrate. The input optic may be physically coupled with one of the first or the second major face of the substrate via an optical adhesive or an optical epoxy. The first nanostructure may be a one-dimensional, two-dimensional, or a three-dimensional nanostructure. The input optic and the first nanostructure may both be on a same one of the first or the second major face of the substrate. The input optic and the first nanostructure may each be respective ones of the first or the second major face of the substrate. The first nanostructure may be spaced along the length of the substrate from the input optic. The input optic may be a second nanostructure, the second nanostructure different than the first nanostructure. The first nanostructure may have a first a lattice constant and the second nanostructure may have a second lattice constant, the second lattice constant different than the first lattice constant of the first nanostructure. The first nanostructure may be selected from the group consisting of a holographic diffraction grating a photonic crystal lattice structure, and a plasmonic structure. The input optic wherein the input optic is selected from the group consisting of a focusing lens, an array of focusing lenses, a prism, an array of prisms, a mirror, an array of mirrors, a reflector, a reflective surface, a reflective boundary, a refractive boundary, and a nanostructure. The first nanostructure may be spaced from the input optic as a function of at least one of: a geometry, a material property, or a thickness of the substrate. The apparatus may further include: a sensor responsive to one or more of the plurality of wavelengths of electromagnetic energy, the sensor positioned to receive light extracted from the substrate at least by the first nanostructure. The input optic may be coupled to input light to the substrate via the first major face of the substrate and the sensor may be a light sensor positioned to receive light exiting the substrate via the second major face of the substrate. The input optic may be coupled to input light to the substrate via the first major face of the substrate and the sensor may be a light sensor positioned to receive light exiting the substrate via the first major face of the substrate. The apparatus may further include: an opaque housing having at least one cavity in which the substrate, the first nanostructure, the input optic and the sensor are housed. The housing may include a conduit aligned to provide light to the input optic. The conduit may include at least one recess positioned along a length of the conduit. The cavity of the housing may have at least one beveled edge that extends along at least a portion of the at least one edge of the substrate, at a non-perpendicular angle with respect to the at least one edge of the substrate. The housing may include a first and a second cavity and at least one aperture that provides a light communicative path between the first and the second cavities, and the substrate and the first nanostructure may be housed in the first cavity and the sensor may be housed in the second cavity. A portion of the first nanostructure may be masked.

A method of fabricating an apparatus may be summarized as including: forming an substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate; forming at least a first nanostructure that selectively extracts electromagnetic energy of a first set of wavelengths from the substrate; and orienting and positioning an input optic to provide electromagnetic energy into the substrate via at least one of the first or the second major face of the substrate.

Forming the first nanostructure may include forming at least one of a first photonic crystal lattice or a plasmonic structure in a dielectric that overlies the first major face of the substrate. Forming the first nanostructure may include at least one of patterning, direct molding, or casting the first nanostructure in a dielectric that includes the substrate. Forming a first nanostructure may include forming a first nanostructure that selectively extracts electromagnetic energy of the first set of wavelengths from the substrate via the first major face of the substrate, and may further include: forming a second nanostructure that selectively extracts electromagnetic energy of a second set of wavelengths from the substrate via the first major face of the substrate, the second set of wavelengths different from the first set of wavelengths. The method may further include: positioning a light sensor to receive light extracted from the substrate at least by the first nanostructure and the second nanostructure. Orienting and positioning an input optic may include orienting and positioning the input optic to provide electromagnetic energy into the substrate in an area on the first or the second major face of the substrate which is greater than an area of at least one of the edges of the substrate. Orienting and positioning an input optic may include forming at least one of a focusing lens, an array of focusing lenses, a prism, an array of prisms, a mirror, an array of mirrors, a reflector, a reflective surface, a reflective boundary, a refractive boundary, and another nanostructure. Orienting and positioning an input optic may include physically directly coupling the input optic with one of the first or the second major face of the substrate. Orienting and positioning an input optic may include physically directly coupling the input optic with one of the first or the second major face of the substrate via an optical adhesive or an optical epoxy. Forming a first nanostructure may include forming a one-dimensional, two-dimensional, or a three-dimensional nanostructure. Forming a first nanostructure may include forming the first nanostructure on a same one of the first or the second major face of the substrate as the input optic. Forming a first nanostructure may include forming the first nanostructure on an opposite one of the first or the second major face from the substrate. Forming a first nanostructure may include forming the first nanostructure spaced along the length of the substrate from the input optic. Forming the input optic may include forming a second nanostructure, the second nanostructure different than the first nanostructure. Forming a first nanostructure may include forming a holographic diffraction grating, a photonic crystal lattice structure or a plasmonic structure. The method may further include: positioning a sensor responsive to at least some of the plurality of wavelengths of electromagnetic energy to receive light extracted from the substrate at least by the first nanostructure. Orienting and positioning an input optic may include orienting and positioning the input optic to input light to the substrate via the first major face of the substrate and positioning a sensor may include positioning the sensor to receive light exiting the substrate via the second major face of the substrate. Orienting and positioning an input optic may include orienting and positioning the input optic to input light to the substrate via the first major face of the substrate and positioning a sensor may include positioning the sensor to receive light exiting the substrate via the first major face of the substrate. The method may further include: housing the substrate, the first nanostructure, the input optic and the sensor in at least one cavity of an opaque housing. The method may further include: providing the opaque housing with a conduit aligned to provide light to the input optic. The method may further include: providing the opaque housing with the conduit having at least one recess positioned along a length of the conduit. The method may further include: providing the opaque housing with at least one beveled edge in the cavity, the at least one beveled edge which extends along at least a portion of the at least one edge of the substrate, at a non-perpendicular angle with respect to the at least one edge of the substrate. The method may further include: providing the opaque housing having a first and a second cavity and at least one aperture that provides a light communicative path between the first and the second cavities, and the substrate and the first photonic crystal lattice are housed in the first cavity and the sensor housed is housed in the second cavity. The method may further include: integrally coupling the substrate with the sensor as a cover glass for the sensor. The method may further include: forming a mask over at least a portion of the first nanostructure. The method may further include: polishing at least one of the first or the second major surfaces. The substrate may be a dielectric and forming a first nanostructure may include: forming at least one of a quartz layer, a fused silica layer, a sodium chloride layer, a plastic layer, a borosilicate float glass layer on a portion of the dielectric substrate.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

Figure 1:
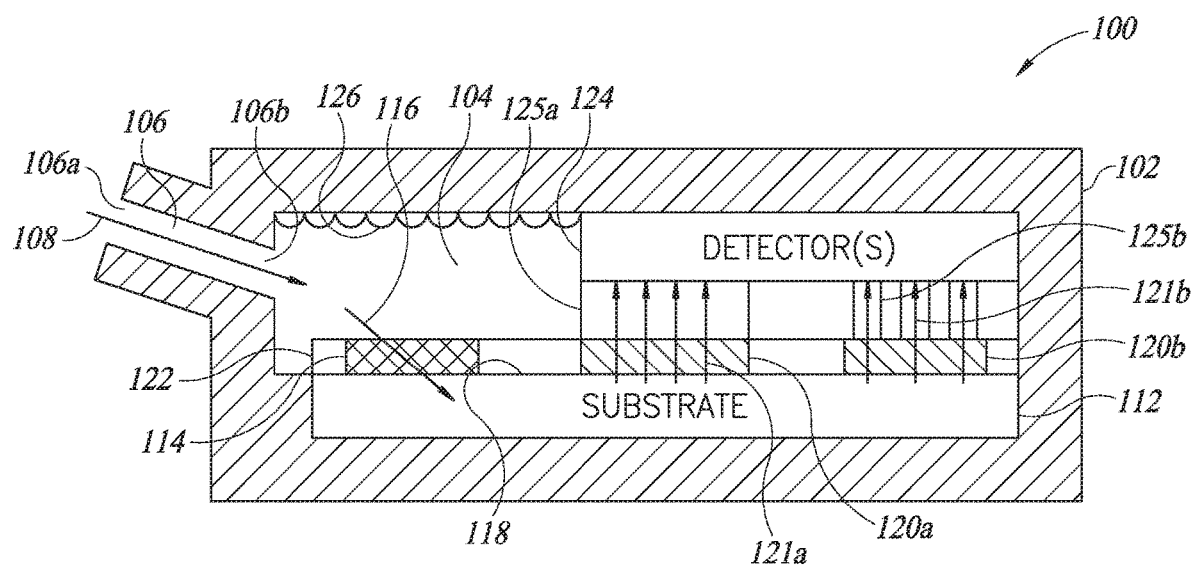
FIG. 1 is a cross-sectional view of an apparatus that includes a housing with an input aperture to provide electromagnetic energy into a substrate via one or more input optics, a number of nanostructures as output optics to pass electromagnetic energy out of the substrate, and a detector positioned to detect electromagnetic energy that passes out of the substrate, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sensors or other transducers, detectors, processor-based systems such as computing systems including processors and nontransitory storage media such as registers, memory, spinning magnetic or optical media and the like, communications devices such as wired or wireless ports (e.g., wireless radios (i.e., transmitters, receivers or transceivers), have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

An article (e.g., spectrometer, component of a spectrometer) can employ input optics and/or output optics to facilitate entry of electromagnetic energy (e.g., light including visible, infrared and/or ultraviolet ranges) into an electromagnetic energy transmissive structure, such as a substrate, slab or layer, via a major face thereof and/or to facilitate extraction or exiting of electromagnetic energy out of the electromagnetic energy transmissive structure. Entry of electromagnetic energy via a major face of the substrate, slab or layer provides a variety of benefits.

The article can employ various types of nanostructures or regions of nanostructures as input optics and/or output optics, to respectively facilitate entry of electromagnetic energy respectively into and out of an electromagnetic energy transmissive structure such as a substrate, slab or layer. Nanostructures can provide periodic structures with dimensions on the scale of nanometers and which can interact with electromagnetic energy, for instance light, in a manner that is characterized by the structural characteristics of the array, e.g., a lattice constant of the array or portion thereof. The nanostructures or regions of nanostructures can include photonic crystals, for instance an ordered two-dimensional or three-dimensional array or lattice of photonic crystals. The nanostructures or regions of nanostructures can include plasmonic nanostructures, for instance an ordered two-dimensional or three-dimensional array or lattice of plasmonic nanostructures. The nanostructures or regions of nanostructures can include holographic diffraction nanostructures, for instance an ordered two-dimensional or three-dimensional array or lattice of holographic diffraction nanostructures. Additionally or alternatively, the article can employ a variety of other types of input optics, for example, mirrors or reflectors, prisms, focusing optics or lenses, and/or reflective or refractive surfaces.

FIG. 1 shows an apparatus 100, according to one illustrated embodiment.

The apparatus 100 includes a housing 102 having at least a first interior 104 and an input aperture 106 to provide electromagnetic energy (represented by arrow 108) into the interior 104 from an exterior 110 of the housing 102.

The apparatus 100 includes a substrate 112 received in the interior 104 of the housing 102. The substrate 112 transmits electromagnetic energy of at least a set of wavelengths or frequencies that are of interest (i.e., ranges of wavelengths or frequencies that is or are to be detected or sensed or measured, e.g., electromagnetic energy in the optical range of wavelengths including electromagnetic energy in the visible range, the infrared range and the ultraviolet range of the electromagnetic spectrum).

The apparatus 100 also includes one or more input optics 114 positioned and oriented to cause electromagnetic energy (represented by arrow 116) to pass into the substrate 112 via a major face 118 of the substrate 112. Such may be advantageous as compared to edge injection of electromagnetic energy into a substrate.

Figure 2:
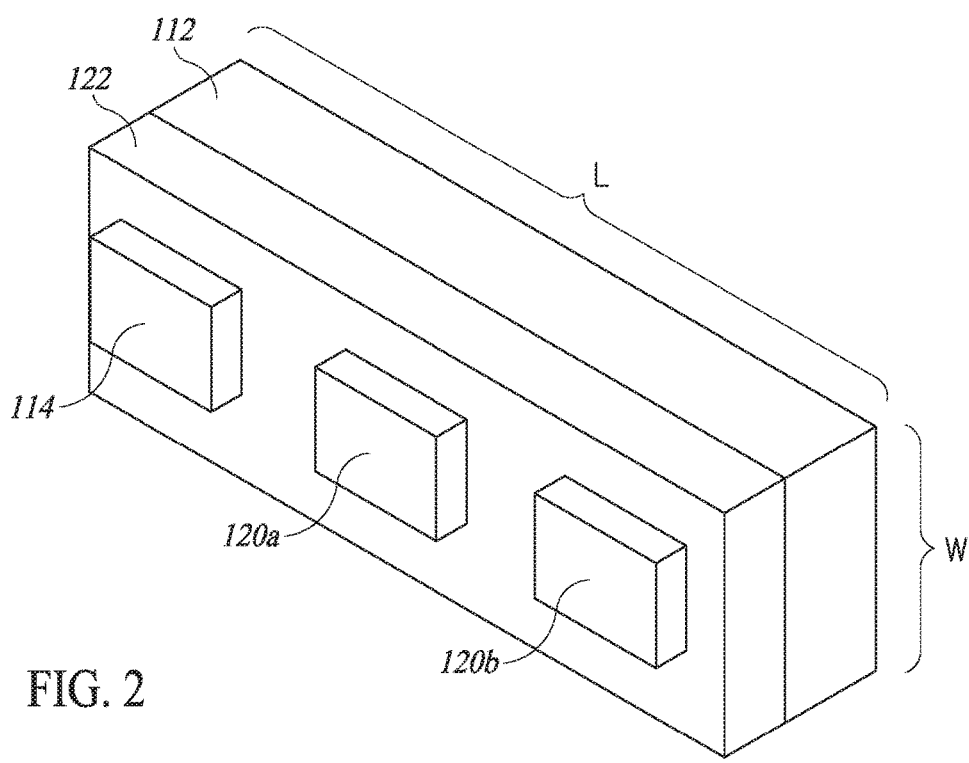
FIG. 2 is an isometric top, right side view of the input optic, output optics and substrate of FIG. 1, the input optic in a first region, the output optics including two sets of nanostructures in a second and third region, respectively, positioned as output optics with respect to the substrate, according to one illustrated embodiment.
Figure 3:
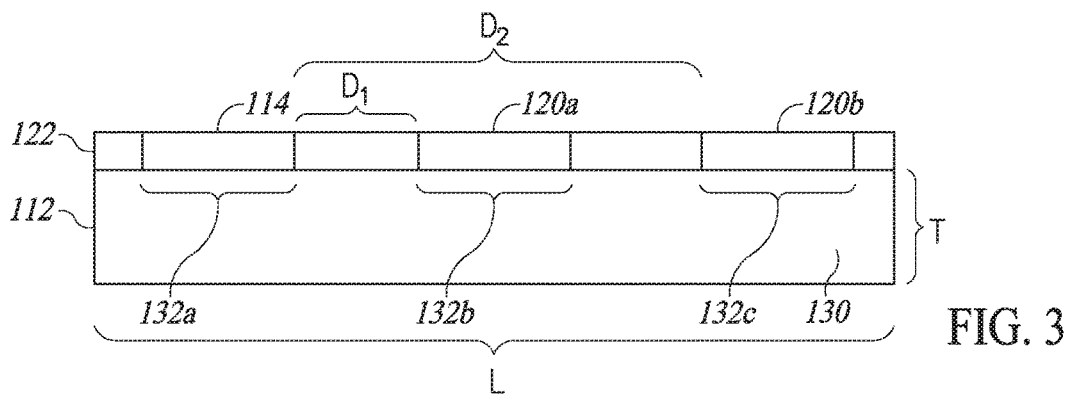
FIG. 3 is a side elevational view of the input optic, output optics and substrate of FIG. 2, according to one illustrated embodiment.

The apparatus 100 further includes a number of output optics 120a, 120b (two shown, collectively 120), which at least in the embodiment of FIGS. 1-3 are in the form of regions of nanostructures, positioned and oriented in the housing 102 to cause electromagnetic energy (represented by first set of arrows 121a and second set of arrows 121b) to pass out of the substrate 112. As illustrated in FIG. 1, the output optics 120 may be formed in a respective layer or structure 122 that is distinct from the substrate 112. As discussed below with reference to FIG. 6, in some implementations the output optics 120 may be formed directly on and/or in the substrate 112. While illustrated as employing two output optics 120a, 120b, some implementations may employ only a single output optic 120a, while other implementations may employ more than two output optics 120a, 120b. Where there are two or more output optics 120a, 120b, the output optics 120a, 120b may be generally spaced along at least a length L (FIG. 2) of the substrate 112.

The apparatus 100 may optionally include one or more detectors 124 (only one shown), positioned to detect electromagnetic energy that passes out of the substrate 112. As illustrated in FIG. 1, the detector 124 may be positioned in the interior 104 of the housing 102. Alternatively, the detector 124 may be distinct from the apparatus 100, or housed in a separate compartment of the housing 102 from substrate 112 and/or output optics 120. The detector(s) 124 may take any of a variety of forms. For example, the detector(s) 124 may advantageously take the form of one or more optical detectors, sensors or transducers that are responsive to optical wavelengths or frequencies of electromagnetic energy, e.g., light in the visible, infrared and/or ultraviolet portions of the electromagnetic spectrum. Also for example, the detector(s) 124 may advantageously take the form of one or more optical linear detector arrays which are responsive to light at various positions along a length of the detector 124. The detector(s) 124 may, for example, take the form of one or more charge-coupled devices (CCDs), and/or one or more complementary-metal-oxide-semiconductor (CMOS) image detectors and/or other optical detector(s), sensor(s) or transducer(s) that produce signals (e.g., electrical signals) in response to incident light.

As illustrated in FIG. 1, a coupling layer 125a or optical fibers 125b (three shown) may extend between the output optics 120a, 120b and the detector 124. The coupling layer 125a or optical fibers 125b are at least transmissive of electromagnetic energy of at least a set of wavelengths or frequencies that are of interest, and in most implementations, propagates light entering such at appropriate angles via total internal reflection from the output optics 120a, 120b and the detector 124.

The housing 102 is generally opaque, preventing or substantially preventing ingress of ranges of electromagnetic energy that are to be detected or sensed or measured, other than via the input aperture 106. The interior 104 of the housing 102 may include one or more features or physical characteristics that reduce or even eliminate stray electromagnetic energy. For example, the interior 104 of the housing 102 may include one or more textual features 126 (e.g., undulations, crenulations, pins, recesses, rounded bumps, dimples) that tend to trap stray electromagnetic energy or to cause such to make many reflections, allowing multiple opportunities for the material of the housing 102 to absorb the stray electromagnetic energy. Additionally or alternatively, the interior 104 of the housing 102 may include one or more physical characteristics (e.g., color such as black, material property for instance a plastic) that tend to absorb the stray electromagnetic energy. For instance, the housing 102 may, for example, be formed of various types of plastics, for example acrylonitrile butadiene styrene (ABS) plastic. Such may further allow the housing 102 to be manufactured inexpensively, for instance via injection molding, and manufactured in any of a large variety of shapes, which may further facilitate the reduction of stray electromagnetic energy.

The input aperture 106 is generally illustrated as a straight passage with spaced apart entrance and exit holes 106a, 106b. The spacing between entrance and exit holes 106a, 106b help eliminate stray electromagnetic energy from entering the interior 104 of the housing 102. In other implementations, the input aperture 106 may include one or more traps or other features to reduce stray electromagnetic energy from entering the interior 104 of the housing 102. The input aperture 106 may, additionally or alternatively, include one or more features (e.g., textual features such as undulations, crenulations, pins, recesses, rounded bumps, dimples) and/or physical characteristics (e.g., color such as black, material property for instance a plastic) that reduce or even eliminate stray electromagnetic energy from entering the interior 104 of the housing 102. Additionally or alternatively, the input aperture 106 may present or provide a non-straight line path from the exterior to the interior (e.g., arcuate, tortuous).

The substrate 112 is typically transmissive of light, allowing light to travel within the substrate 112. The substrate 112 may advantageously take the form of a dielectric substrate. In some implementations, the substrate 112 may generally transmit electromagnetic energy at least of a set of wavelengths or frequencies that are of interest (i.e., ranges of wavelengths or frequencies that is or are to be detected or sensed or measured). Such transmission may be without total internal reflection. In other implementations the substrate 112 may take the form of a planar or rectangular or dielectric slab waveguide, that propagates electromagnetic energy at least of a set of wavelengths or frequencies that are of interest (i.e., ranges of wavelengths or frequencies that is or are to be detected or sensed or measured) and which enter the substrate at angles greater than a critical angle via total internal reflection along a length of the substrate.

Electromagnetic energy may be indiscriminately transmitted throughout a substrate, slab or layer, or the electromagnetic energy may be propagated (i.e., waveguided) substantially along a principal direction (e.g., a length) of the substrate, slab or layer via total internal reflection. Nanostructures formed in or one the substrate, slab or layer or otherwise optically coupled to the substrate, slab or layer can cause specific wavelength components of the electromagnetic energy to exit (e.g., be extracted from) the substrate, slab or layer. This approach can be employed to spatially resolve the components of the electromagnetic energy, which can be detected or sensed by a detector or sensor, and converted into information (e.g., raw information in analog or digital form) that is representative of wavelength distribution in the incident light.

FIGS. 2 and 3 show the input optic 114, the output optics 120 and substrate 112 of the apparatus 100.

In the illustrated embodiment, the input optic 114 and the output optics 120 are formed in a layer 128, distinct from the substrate 112. In other implementations discussed herein, the input optic 114 and the output optics 120 are formed directly on and/or in the substrate 112.

As previously noted, the input optic 114 may advantageously cause electromagnetic energy, for example light, to enter the substrate 112 via a major face 118 of the substrate 112. The major face 118 is a face of the substrate 112, and is distinguishable from an edge 130 of the substrate 112 in that the major face 118 extends along two major axes of the substrate 112, that is the length L and the width W, while the edge 130 extends along a minor axis, that is thickness T. It should be noted that in some implementations, the length L and the width W of the substrate 112 are unequal to each other, the substrate 112 have a rectangular profile. In other implementations, the length L and the width W of the substrate 112 are equal to one another, the substrate 112 have a square profile. In some instances, the substrate may transmit electromagnetic energy without total internal reflection. For example, in some implementations, the substrate transmits all electromagnetic energy that enters the substrate without total internal reflection. In other implementations, the substrate transmits electromagnetic energy that enters at acute angles without total internal reflection, while propagating electromagnetic energy that enters at angles greater than a critical angle via total internal reflection.

The input optic 114 is located in a first region 132a (FIG. 3), the output optics 120a, 120b are formed by respective ones of two sets of nanostructures in a second 132b (FIG. 3) and third region 132c (FIG. 3), respectively, the first, second and third regions 132a-132c spaced from one another along the length L of the substrate 112. In some implementations a distance $D_1$ between the first region 132a and the second region 132b is determined at least in part by a geometry and material properties of the input or "coupling" optic. In some implementations a distance dl between the first region 132a and the second region 132b is determined at least in part by a geometry and material properties of the input or "coupling" optic as well as by a thickness $D_2$ of the substrate 112.

For example, an array of nanostructures can extract electromagnetic energy (e.g., light) in spatially defined patterns that define or deterministically relate to an incoming spectrum of electromagnetic energy passing (e.g., propagating or otherwise transmitting) through the substrate, slab or layer. A detector, sensor or other transducer can capture images or otherwise detect, sense or measure intensity and/or wavelength at various locations on the nanostructure(s) or across at least one dimension (e.g., length) of the detector or sensor or transducer. As discussed below with reference to FIG. 27, one or more processor-based devices may employ the image information to determine the radiation spectrum of the incident electromagnetic energy, including the presence and/or intensity of one or more specific ranges of wavelengths (e.g., for detection of a particular atomic or molecular emission line).

Various nanostructures may be formed (e.g., patterned into the substrate, slab or another layer) using various nano-imprint technologies.

A nanostructure array or lattice (e.g., photonic crystal, plasmonic nanostructure array or lattice, holographic diffraction grating nanostructures array of lattice) may comprise and/or be formed in a dielectric material. The nanostructure array or lattice can be located on an exterior surface or boundary of the substrate (e.g., optical waveguide). The nanostructure array or lattice can comprise a first surface including a first array of periodic features on or in the dielectric material. The array can extend in at least two dimensions (e.g., along a length and width, optional along a depth or thickness), and can have an effective dielectric permittivity that is different from a dielectric permittivity of the surrounding dielectric material. The periodic features have a defined or specified lattice constant, and the portion of the electromagnetic energy which the periodic features extract from the substrate, slab or layer is a function of the defined specified lattice constant.

As discussed further below with reference to FIG. 27, the article or an apparatus employing the article may include an illumination source, for instance standard LEDs, which emit in a range of wavelengths (e.g., white light emitting LEDs). The nanostructures may be responsive to only certain ranges of wavelength (e.g., red, blue, ultraviolet), or may be more generally responsive (e.g., all visible wavelengths, all optical wavelengths, i.e., visible, at least near-infrared, at least near-ultraviolet).

Figure 4:
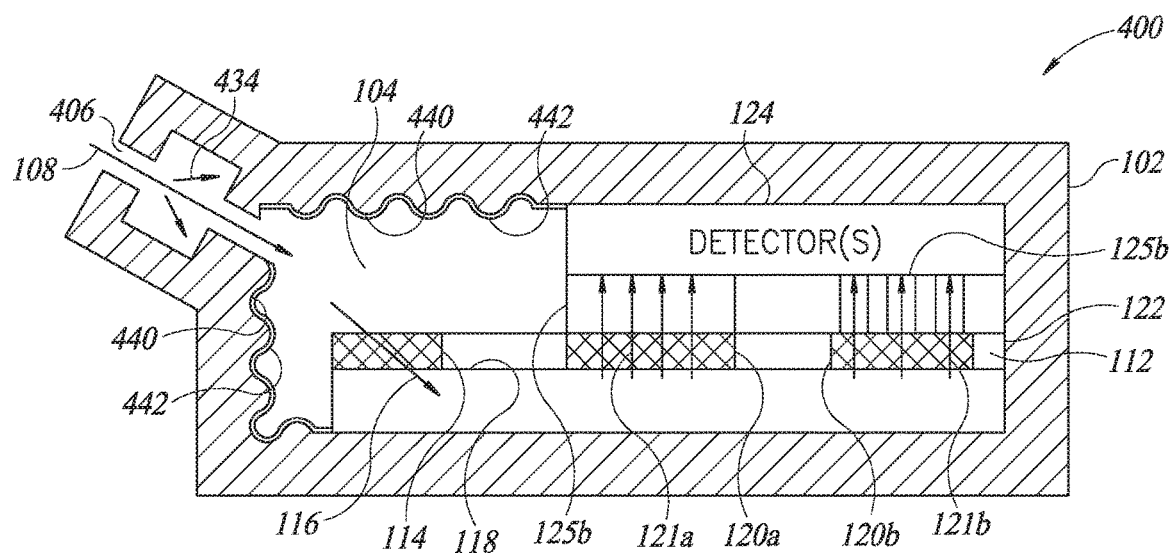
FIG. 4 is a cross-sectional view of an apparatus that includes a housing with an input aperture to provide electromagnetic energy into a substrate via one or more input optics, the input aperture having a recess therein to trap or diminish stray electromagnetic energy, a number of nanostructures as output optics to pass electromagnetic energy out of the substrate, and a detector positioned to detect electromagnetic energy that passes out of the substrate, according to one illustrated embodiment.

FIG. 4 shows an apparatus 400, according to one illustrated embodiment.

The apparatus 400 is in many respects similar to the apparatus 100 (FIG. 1), thus similar or even identical structures or elements are identified by the same reference numbers as used in the embodiment of FIGS. 1-3. In the interest of conciseness, only significant differences are discussed below.

The housing 102 includes an input aperture 406 that has a recess 434 therein to trap or diminish stray electromagnetic energy, and/or electromagnetic energy entering at other than desired angles. The recess 434 has walls that extend in a nonparallel direction with respect to a principal axis of the input aperture 406, which can absorb or reflect electromagnetic energy that does not arrive at desired angles. Additionally or alternatively, the input aperture 406 may include one or more features (e.g., textual features such as undulations, crenulations, pins, recesses, rounded bumps, dimples) and/or physical characteristics (e.g., color such as black, material property for instance a plastic) that reduce or even eliminate stray electromagnetic energy from entering the interior 104 of the housing 102. Additionally or alternatively, the input aperture 406 may present or provide a non-straight line path from the exterior to the interior (e.g., arcuate, tortuous).

Additionally or alternatively, an interior wall that forms the interior 104 of the housing 102 may have a plurality of corrugated or crenulated ridges 440 to trap or diminish stray electromagnetic energy. Additionally or alternatively, an interior wall that forms the interior 104 of the housing 102 may have one or more layers of a light absorbing paint, foam, overcoat, or other coating 442 to trap or diminish stray electromagnetic energy.

Figure 5:
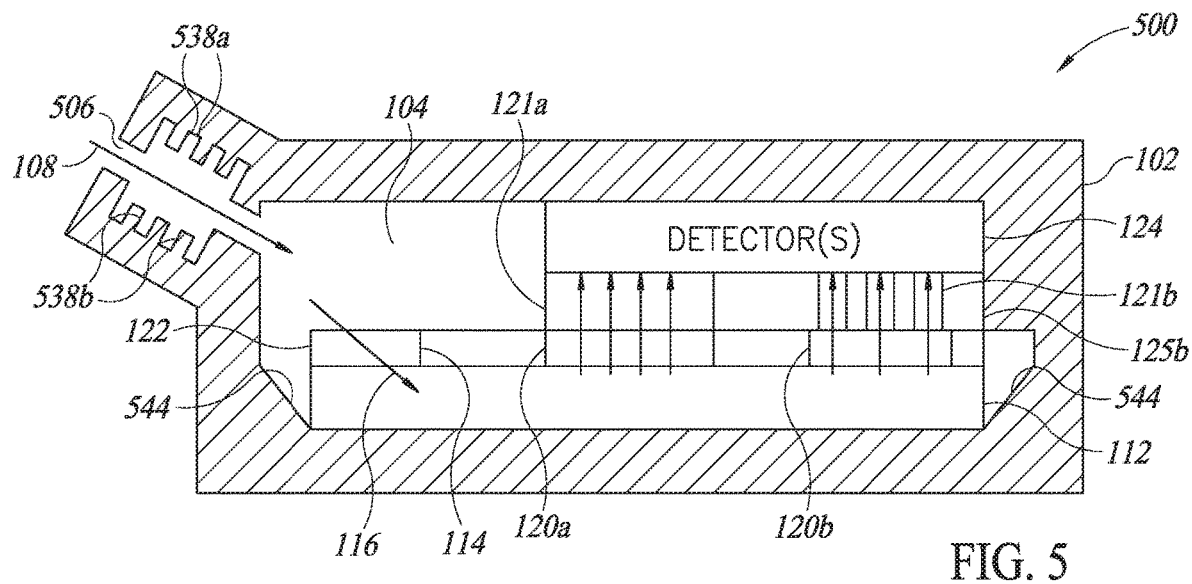
FIG. 5 is a cross-sectional view of an apparatus that includes a housing with an input aperture to provide electromagnetic energy into a substrate via one or more input optics, the input aperture having a plurality of corrugated or crenulated ridges or baffles therein to trap or diminish stray electromagnetic energy, a number of nanostructures as output optics to pass electromagnetic energy out of the substrate, and a detector positioned to detect electromagnetic energy that passes out of the substrate, according to one illustrated embodiment.

FIG. 5 shows an apparatus 500, according to one illustrated embodiment.

The apparatus 500 is in many respects similar to the apparatus 100 (FIG. 1) and 400 (FIG. 4), thus similar or even identical structures or elements are identified by the same reference numbers as used in the embodiment of FIGS. 1-3 and the embodiment of FIG. 4. In the interest of conciseness, only significant differences are discussed below.

The housing 102 includes an aperture 506 that has a plurality of corrugated or crenulated ridges or baffles 538a, 538b therein to trap or diminish stray electromagnetic energy, and/or electromagnetic energy entering at other than desired angles.

The corrugated or crenulated ridges or baffles 538a, 538b extend in a nonparallel direction with respect to a principal axis of the input aperture, which can absorb or reflect electromagnetic energy that does not arrive at desired angles. Additionally or alternatively, the input aperture 506 may include one or more features (e.g., textual features such as undulations, crenulations, pins, recesses, rounded bumps, dimples) and/or physical characteristics (e.g., color such as black, material property for instance a plastic) that reduce or even eliminate stray electromagnetic energy from entering the interior 104 of the housing 102. Additionally or alternatively, the input aperture 506 may present or provide a non-straight line path from the exterior to the interior (e.g., arcuate, tortuous).

Additionally or alternatively, an interior wall that forms the interior 104 of the housing 102 may have one or more beveled or chamfered portions 544 (two shown), angled with respect to the substrate 112 and/or other components, to diminish the effect of stray electromagnetic energy. The beveled portion 544 may, for example, extend along or about the perimeter or edge 130 of the substrate 112 and may be nonparallel with the perimeter or edge 130. Additionally or alternatively, the interior wall that forms the interior 104 of the housing 102 may have one or more layers of a light absorbing paint, foam, overcoat, or other coating 442 (FIG. 4) to trap or diminish stray electromagnetic energy.

Figure 6:
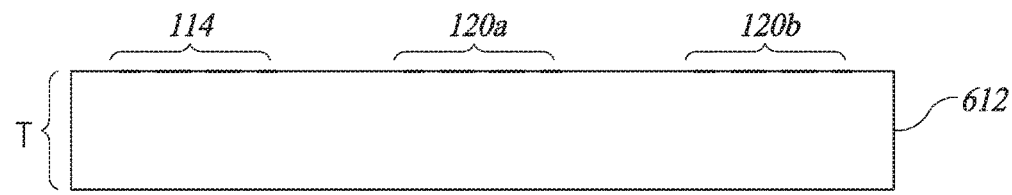
FIG. 6 is a side elevational view of an input optic and a number of output optics which are formed or reside directly on and/or in a substrate, according to one illustrated embodiment, which can be employed in the embodiments of FIGS. 1-5 without the using a dedicated layer for the input and/or output that is distinct from the substrate.

FIG. 6 shows a substrate 612 having an input optic and a number of output optics, according to one illustrated embodiment. The substrate 612 can be employed in the embodiments of FIGS. 1-5, for example without the using a dedicated layer 122 (e.g., FIGS. 1, 3-5) for the input 114 and/or output optics 120 that is distinct from the substrate 112.

In particular, the input optic 114 may be formed on and/or in the substrate 612, or may otherwise reside directly on and/or in the substrate 612. The output optic(s) 120a, 120b may be formed on and/or in the substrate 612, or may otherwise reside directly on and/or in the substrate 612. While illustrated on or proximate one outer surface of the substrate 612, in some implementations the input optic 114 and/or the output optic(s) 102a, 120b may extend completely or almost completely through the substrate 612. Alternatively, as discussed below with respect to FIG. 10, the input optic 114 may be at or proximate a first outer surface of the substrate 612 while the output optic(s) 102a, 120b are at or proximate a second outer surface of the substrate 612, the second outer surface opposed to the first outer surface across a thickness T of the substrate 612.

Figure 7:
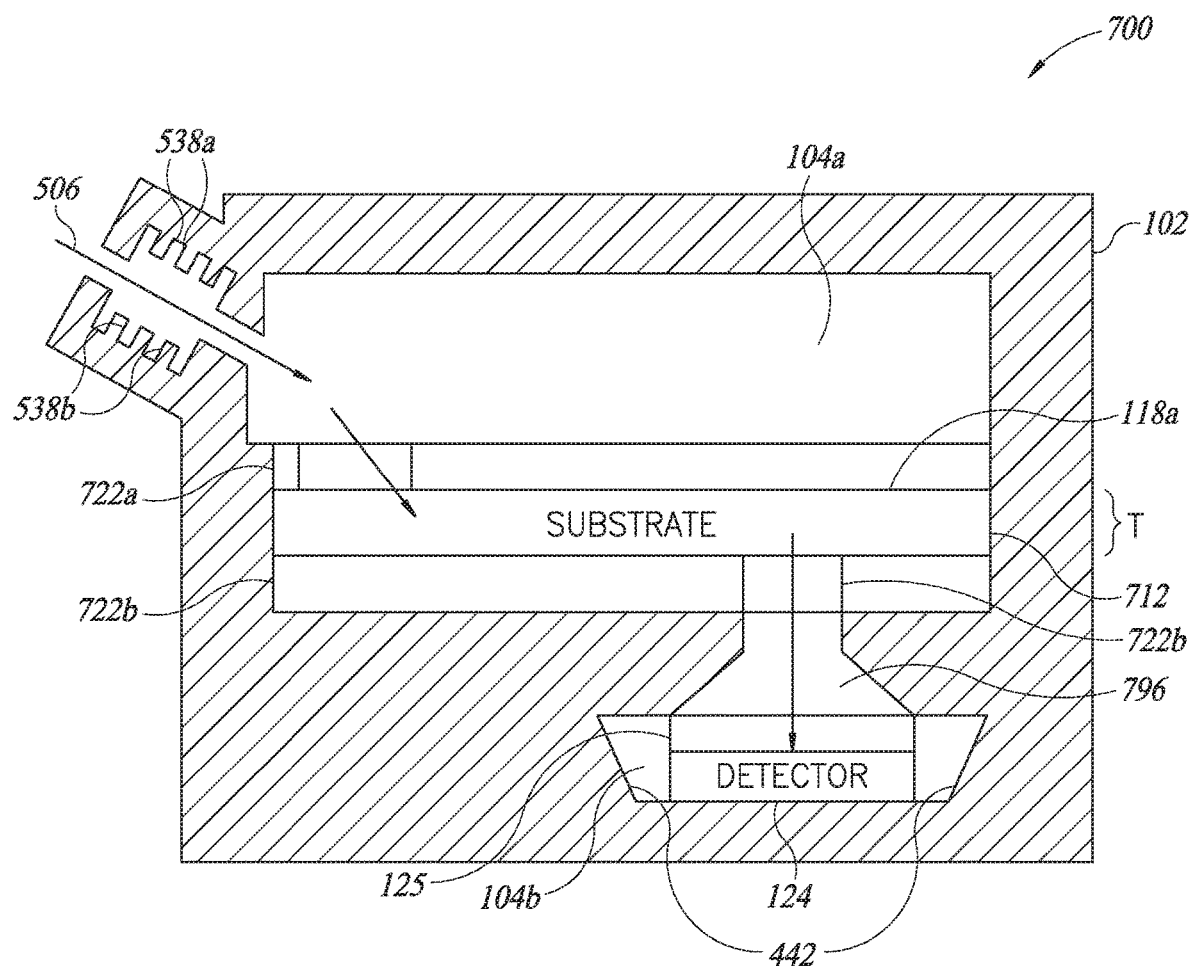
FIG. 7 is a cross-sectional view of an apparatus that includes a housing with an input aperture to provide electromagnetic energy into a first major face of a substrate via one or more input optics, a number of output optics to pass electromagnetic energy out of a second major face of the substrate, and a detector positioned to detect electromagnetic energy that passes out of the second major face of the substrate via an internal or intermediate aperture, according to one illustrated embodiment.

FIG. 7 shows an apparatus 700, according to one illustrated embodiment.

The apparatus 700 is in many respects similar to the apparatus 100 (FIG. 1), 400 (FIG. 4), 500 (FIG. 5), thus similar or even identical structures or elements are identified by the same reference numbers as used in the embodiment of FIGS. 1-5. In the interest of conciseness, only significant differences are discussed below.

Figure 8:
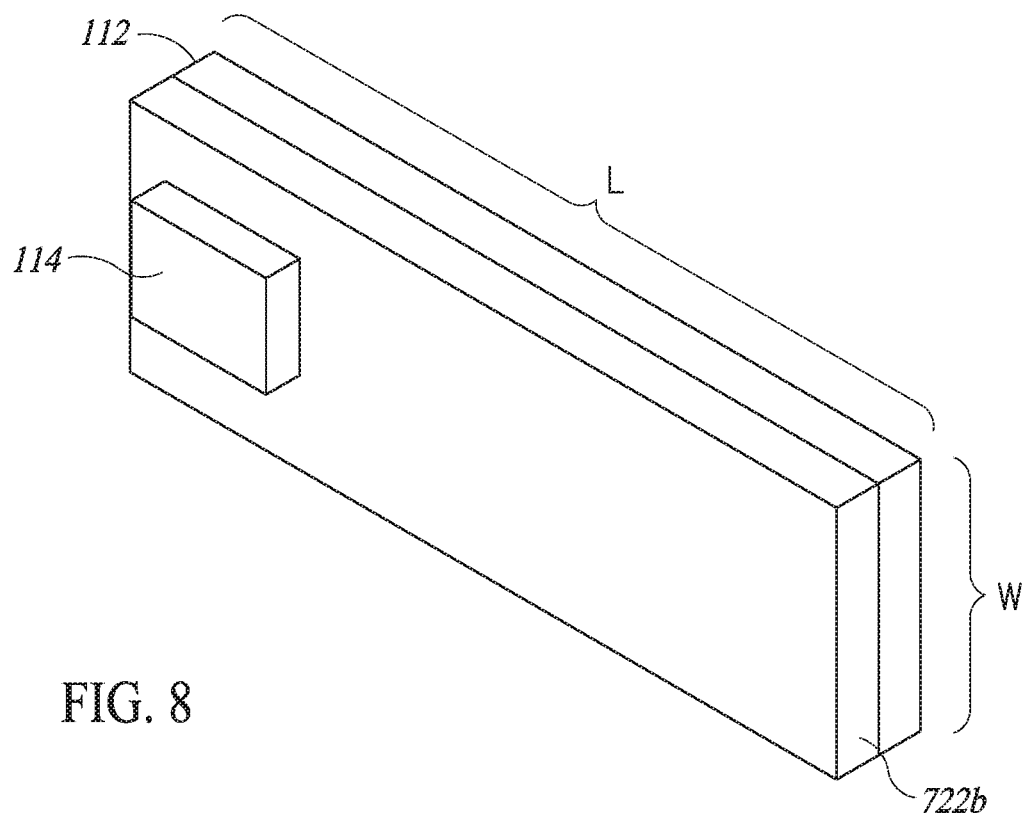
FIG. 8 is an isometric top, right side view of the input optic(s) and substrate of FIG. 7, the input optic in a first region, according to one illustrated embodiment.
Figure 9:
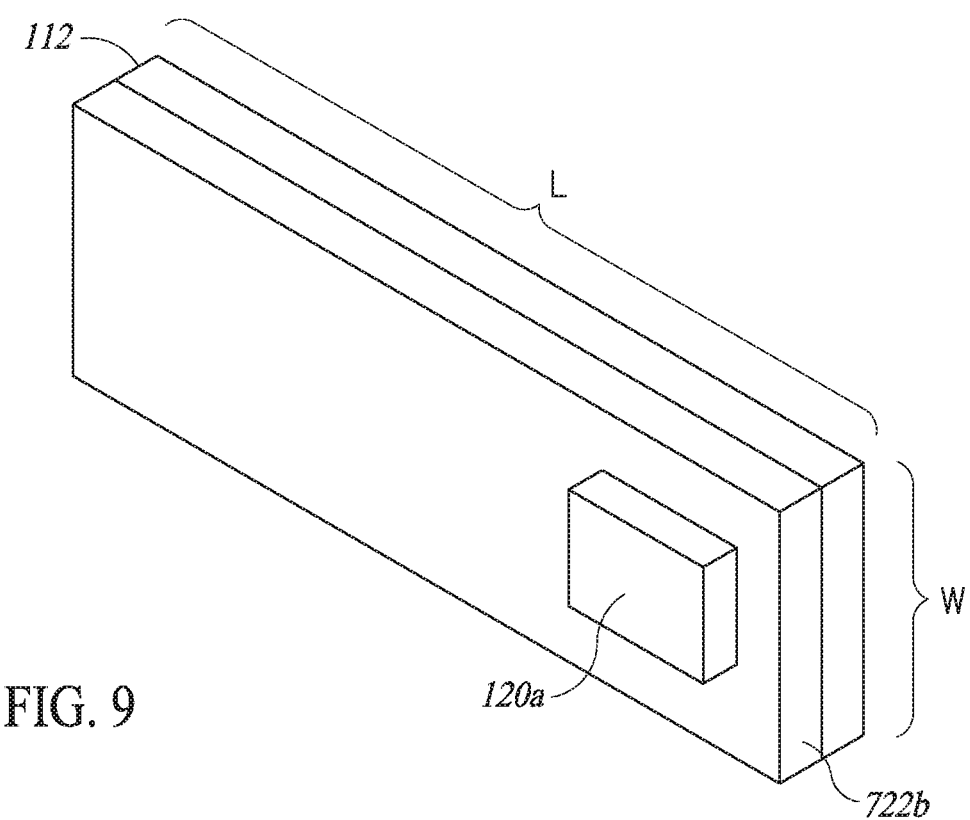
FIG. 9 is an isometric bottom, right side view of the output optic(s) and substrate of FIG. 7, the input optic in a second region, according to one illustrated embodiment.

In contrast to the previously described embodiments, the detector(s) 124 is/are positioned on an opposite side of the substrate 112 from a major face that the electromagnetic energy enters (e.g., side on which the input optic(s) reside). Thus, as best illustrated in FIGS. 8 and 9, input optic(s) 114 may be formed on or in, or carried by, on or in, a first major face 118a of the substrate 112, while output optic(s) 120a (only one shown) are formed on or in, or carried by, on or in a second major face 118b of the substrate 112. The second major face 118b of the substrate 712 is opposed to the first major face 118a of the substrate 712 across a thickness T (FIG. 7) of the substrate 112.

The substrate 112 separates the interior 104 of the housing into two distinct portions or chambers, an upper portion or chamber 104a and a lower portion or chamber 104b. The denomination as upper and lower are in reference to the orientation of the housing 102 in the drawing, and are not meant to be limiting. In use, the housing 102 can be oriented in any orientation, for example with the lower portion or chamber 104b positioned relatively above the upper portion or chamber 104a, or with the lower portion or chamber 104b and upper portion or chamber 104a side by side.

The input aperture 506 provides electromagnetic energy into the upper portion or chamber 104a, and one or more input optics 114 couples the electromagnetic energy into the substrate 112 via the first major face 118a. One or more output optic(s) 120a couple the electromagnetic energy from the substrate 112 via the second major face 118b toward one or more detector(s) 124 at one or more positions along a length L of the substrate 112 or length of the detector(s) 124. As noted elsewhere herein, different wavelengths or frequencies of electromagnetic energy may be coupled from the substrate at different respective positions. For example, shorter wavelengths may be coupled from the substrate 112 at a first position along a length thereof, while progressively longer wavelengths are coupled from the substrate 112 at sequential positions along the length thereof relative to the first position. Thus, a linear optical detector 124 may be oriented in parallel with the substrate 112, and advantageously provide or generate information that is indicative of the amount of or amplitude of electromagnetic energy at two or more respective wavelengths.

The upper portion or chamber 104a may include one or more traps or other features to reduce stray electromagnetic energy from entering the input optic(s) 114. For example, an interior surface of the housing 102 may, additionally or alternatively, include one or more features (e.g., textual features such as undulations, crenulations, pins, recesses, rounded bumps, dimples) and/or physical characteristics (e.g., color such as black, material property for instance a plastic) that reduce or even eliminate stray electromagnetic energy from entering the input optic(s) 114 or substrate 112. Additionally or alternatively, an interior wall that forms the upper portion or chamber 104a of the housing 102 may have one or more layers of a light absorbing paint, foam, overcoat, or other coating 442 to trap or diminish stray electromagnetic energy.

The housing 102 may form an internal or intermediate aperture 746 between the upper and lower portions or chambers 104a, 104b, respectively. The internal or intermediate aperture 746 may advantageously limit exposure by the detector(s) 124 to stray electromagnetic energy. As illustrated, the lower portion or chamber 104b may include one or more beveled or chamfered portions 544 (two shown), angled with respect to the substrate 112 and/or other components, to diminish the effect of stray electromagnetic energy. The beveled portion 544 may, for example, extend along or about the perimeter or edge 130 (FIG. 3) of the substrate 112 and may be nonparallel with the perimeter or edge 130. Additionally or alternatively, the interior wall that forms the lower portion or chamber 104 of the housing 102 may have one or more layers of a light absorbing paint, foam, overcoat, or other coating 442 (FIG. 4) to trap or diminish stray electromagnetic energy.

FIG. 8 shows an input optic(s) 114 of FIG. 7, which may be formed in a layer 722a that resides on or above the first major face 118a of the substrate 112. Alternatively, the input optic(s) 114 may be distinct unitary separable elements, that is the input optic(s) may not constitute some portion of a layer that spans the entire major face 118a. As a further alternative, the input optic(s) 114 may be integrated into or directly on the substrate 112, for example as illustrated in FIG. 10.

FIG. 9 shows an output optic(s) 120 of FIG. 7, which may be formed in a layer 722b that resides on or above the first major face 118a of the substrate 112. Alternatively, the output optic(s) 120 may be distinct unitary separable elements, that is the input optic(s) may not constitute some portion of a layer that spans the entire major face 118a. As a further alternative, the output optic(s) 120 may be integrated into or directly on the substrate 112, for example as illustrated in FIG. 10.

Figure 10:
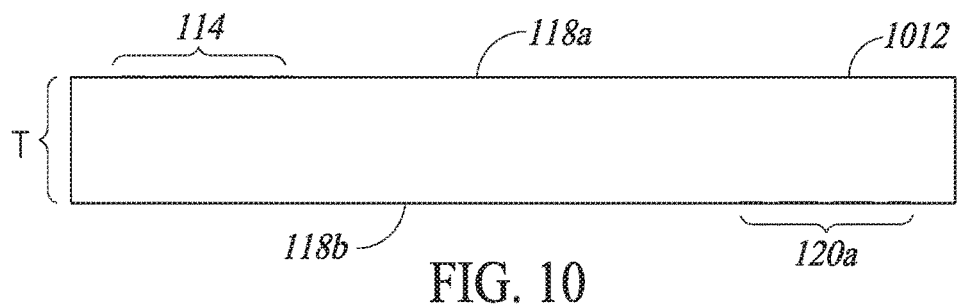
FIG. 10 is a side elevational view of an input optic and a number of output optics which are formed or reside directly on and/or in a substrate, according to one illustrated embodiment, which can be employed in the embodiment of FIG. 7 without the using a dedicated layer for the input and/or output that is distinct from the substrate.

FIG. 10 shows a substrate 1012 having an input optic 114 and a number of output optics 120a (only one shown), according to one illustrated embodiment. The substrate 612 can be employed in the embodiment of FIG. 7, for example without the using dedicated layers 722a, 722b (e.g., FIGS. 7-9) for the input 114 and/or output optics 120 that is distinct from the substrate 112.

In particular, the input optic 114 may be formed on and/or in the substrate 712, or may otherwise reside directly on and/or in the substrate 712. For example, the output optic(s) 120a, 120b may be formed on and/or in the second major face 118b of the substrate 712, or may otherwise reside directly on and/or in second major face 118b of the substrate 712. Again, the first major face 118a and the second major face 118b are opposed to one another across a thickness T of the substrate 712. The first and the second major faces 118a, 118b are distinguishable from the edges of the substrate 712 as extending along the principal axes (i.e., length and width) as compared to the minor axis (i.e., thickness).

Figure 11:
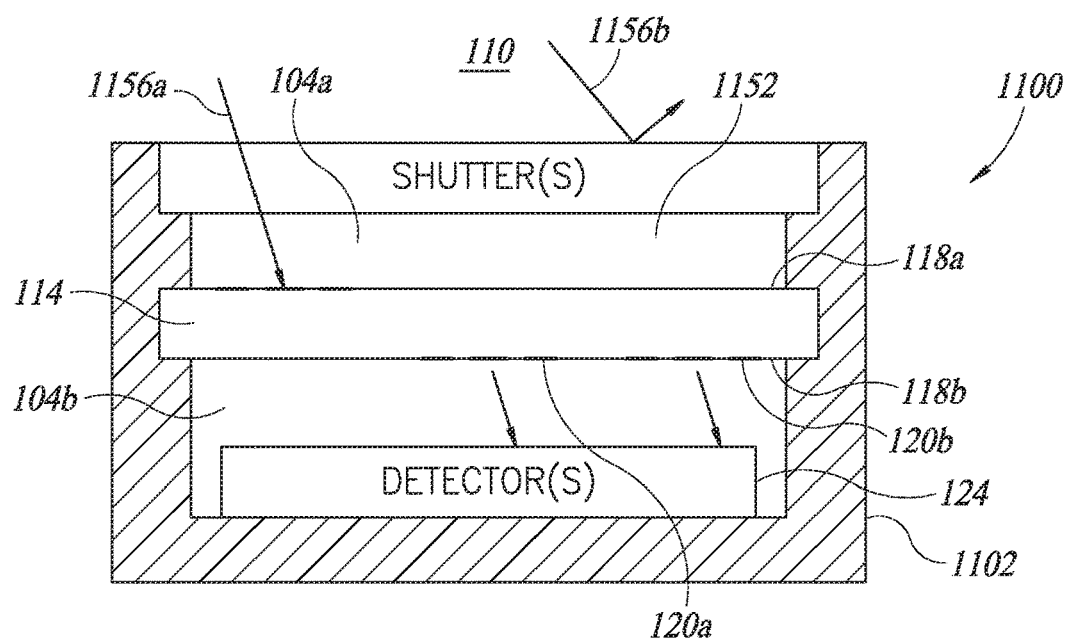
FIG. 11 is a cross-sectional view of an apparatus that includes a housing with the substrate and input and output optics of FIG. 6, incorporated as a "cover glass" of a detector, according to one illustrated embodiment, with an optional shutter.
Figure 12:
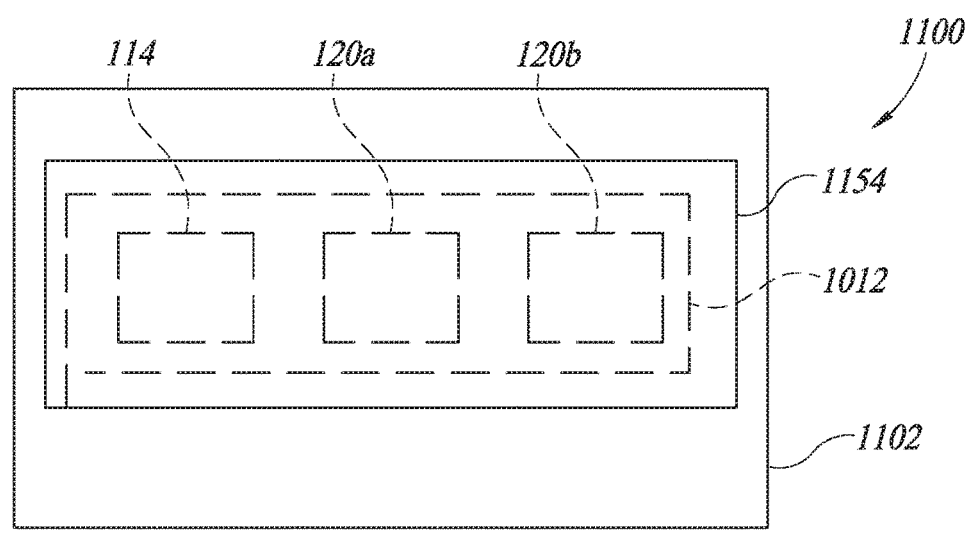
FIG. 12 is a top plan view of the apparatus of FIG. 11.

FIGS. 11 and 12 show an apparatus 1100 that includes a housing 1102 with a substrate 1012 and input and output optics 114, 120a, 120b (two shown) incorporated as a "cover glass" of a detector 124, according to one illustrated embodiment, with an optional shutter 1150.

The apparatus 1100 may be similar, and in some respects even identical, to previously described embodiments. For instance, the substrate 1012 may be similar or even identical to that illustrated in FIG. 10. Thus, similar or identical structures or elements are called out with the same reference numbers used in previously described embodiments. In the interest of conciseness, only significant differences between the embodiment of FIGS. 11 and 12 and the previously described embodiments are discussed below.

In contrast to previously described embodiments, the substrate 1012 serves as a cover glass for the detector 124. As with the embodiment of FIG. 7, the substrate 1012 divides the interior 104 of the housing 1102 into an upper portion or chamber 104a and a lower portion of chamber 104b. As previously noted, the denomination as upper or lower is not intended to limit use to any particular orientation, but is simply a convenience for reference with respect to the orientation in the drawings. Also in contrast to previously described embodiments, the housing 1102 may have a relatively large opening 1152 to an exterior 110, rather than an input aperture (e.g., input aperture 106, 406, 506).

The housing 1102 may terminate co-terminally or coplanar with the first major surface 118a of the substrate 1012. Alternatively, as illustrated, the housing 1102 may extend past the first major face 118a of the substrate 1012, providing a structure to mount one or more optional shutters 1154. The shutter(s) 1154 is/are operable to control passage of electromagnetic energy into the upper portion of chamber 104a from an exterior 110 of the housing 1102, for instance allowing passage of light (arrow 1156a) in a first state (e.g., opened), while blocking passage of light (arrow 1156b) in a second state (e.g., closed), different from the first state. For example, the shutter 1154 may be operable to open and close. Additionally, the shutter 1154 may be operable to open to two or more distinct sizes, thus forming an input aperture with two or more distinct aperture sizes or settings.

The shutter 1154 may take any of a large variety of forms, for example one or more mechanical shutters or electronic shutters. Thus, for example the shutter 1154 may include a mechanical barrier (e.g., iris shutter, Copal or leaf shutter) an actuator (e.g., electric motor, solenoid, piezoelectric element), and a transmission to physically couple the actuator to the mechanical barrier. Also for example, the shutter 1154 may take the form of a plane of material with an array of individual addressable elements (e.g., LCD panel), which are responsive to signals (e.g., voltages) to block or transmit light, or optionally control an amount of light transmission therethrough. Such may, for instance, take the form of an LCD panel positioned between the exterior and the interior 104a of the housing 1102, with the individual addressable elements or pixels of the LCD panel controlled via appropriate signals to control the passage of light therethrough.

The inclusion of a shutter 1154 may advantageously allow dual use operation of the apparatus 1100. For example, the apparatus 1100 may function as a spectral sensor when the shutter 1154 is in the closed state, for example during a first period of time. The same apparatus 1100 may function as a conventional detector (e.g., camera) when the shutter 1154 is in the open state, for example during a second period of time.

Figure 13:
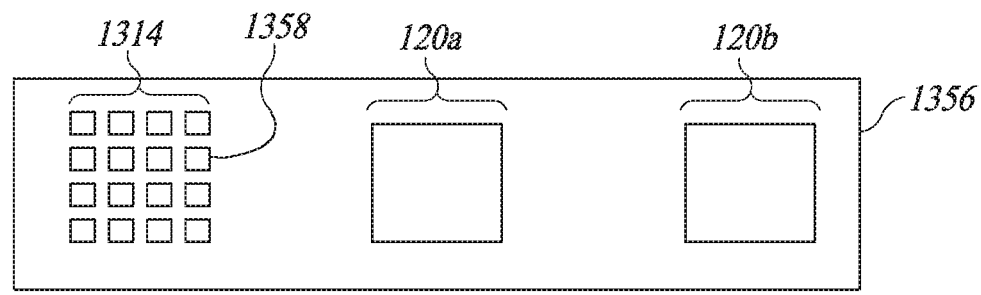
FIG. 13 is a top plan view of an input optic and a number of output optics which may be formed or reside on or in a layer (e.g., optical layer or substrate), according to at least one illustrated embodiment, in which the input optic comprises one or more mirrors or reflectors.

FIG. 13 shows an input optic 1314 and a number of output optics 120a, 120b (only two shown) which may be formed or reside on or in a layer 1356 (e.g., optical layer 122 or substrate 112, 612, 1012), according to at least one illustrated embodiment. The input optics 1314 and output optics 120a, 120b may be employed in any of the embodiments of FIG. 1, 4 or 5, or alternatively in any of the embodiments of FIG. 7 or 11 if the output optics 120a, 120b are on the opposite side of the substrate from the input optic(s) 1314.

In particular, FIG. 13 illustrates the input optics 1314 as comprising one or more mirrors or reflectors 1358 (only one called out). The one or more mirrors or reflectors 1358 may be planar or may be curved.

Figure 14:
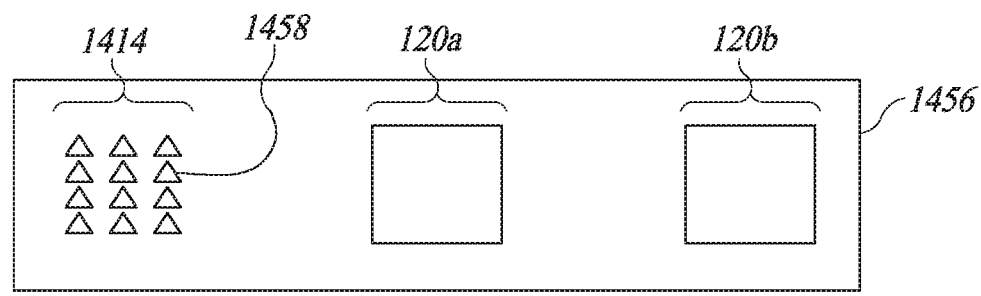
FIG. 14 is a top plan view of an input optic and a number of output optics which may be formed or reside on or in a layer (e.g., optical layer or substrate), according to at least one illustrated embodiment, in which the input optic comprises one or more prisms.

FIG. 14 shows an input optic 1414 and a number of output optics 120a, 120b (only two shown) which may be formed or reside on or in a layer 1456 (e.g., optical layer 122 or substrate 112, 612, 1012), according to at least one illustrated embodiment. The input optics 1414 and output optics 120a, 120b may be employed in any of the embodiments of FIG. 1, 4 or 5, or alternatively in any of the embodiments of FIG. 7 or 11 if the output optics 120a, 120b are on the opposite side of the substrate from the input optic(s) 1414.

In particular, FIG. 14 illustrates the input optics 1414 as comprising one or more prisms 1458 (only one called out).

Figure 15:
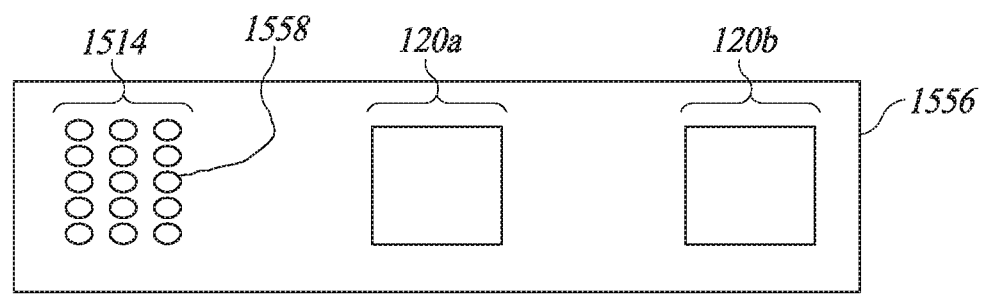
FIG. 15 is a top plan view of an input optic and a number of output optics which may be formed or reside on or in a layer (e.g., optical layer or substrate), according to at least one illustrated embodiment, in which the input optic comprises one or more focusing optics or lenses.

FIG. 15 shows an input optic 1514 and a number of output optics 120a, 120b (only two shown) which may be formed or reside on or in a layer 1556 (e.g., optical layer 122 or substrate 112, 612, 1012), according to at least one illustrated embodiment. The input optics 1514 and output optics 120a, 120b may be employed in any of the embodiments of FIG. 1, 4 or 5, or alternatively in any of the embodiments of FIG. 7 or 11 if the output optics 120a, 120b are on the opposite side of the substrate from the input optic(s) 1514.

In particular, FIG. 15 illustrates the input optics 1514 as comprising one or more focusing optics or focusing lenses 1558 (only one called out).

Figure 16:
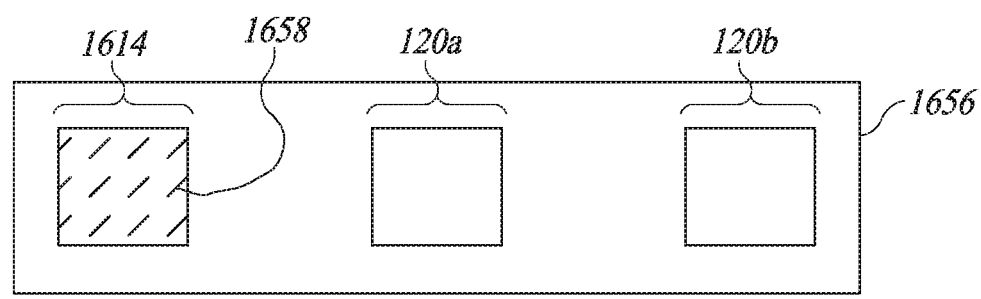
FIG. 16 is a top plan view of an input optic and a number of output optics which may be formed or reside on or in a layer (e.g., optical layer or substrate), according to at least one illustrated embodiment, in which the input optic comprises one or more reflective or refractive surfaces.

FIG. 16 shows an input optic 1614 and a number of output optics 120a, 120b (only two shown) which may be formed or reside on or in a layer 1656 (e.g., optical layer 122 or substrate 112, 612, 1012), according to at least one illustrated embodiment. The input optics 1614 and output optics

120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 1614.

In particular, FIG. 16 illustrates the input optics 1614 as comprising one or more reflective or refractive surfaces or elements 1658 (only one called out).

Figure 17:
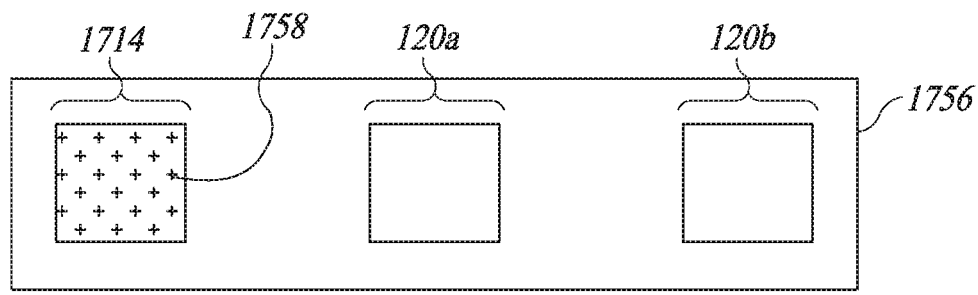
FIG. 17 is a top plan view of an input optic and a number of output optics which may be formed or reside on or in a layer (e.g., optical layer or substrate), according to at least one illustrated embodiment, in which the input optic comprises regions of photonic crystal lattice nanostructures.

FIG. 17 shows an input optic 1714 and a number of output optics 120*a*, 120*b* (only two shown) which may be formed or reside on or in a layer 1756 (e.g., optical layer 122 or substrate 112, 612, 1012), according to at least one illustrated embodiment. The input optics 1714 and output optics 120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 1714.

In particular, FIG. 17 illustrates the input optics 1714 as comprising one or more regions of nanostructures in the form of photonic crystal lattice nanostructures 1758 (only one called out).

Figure 18:
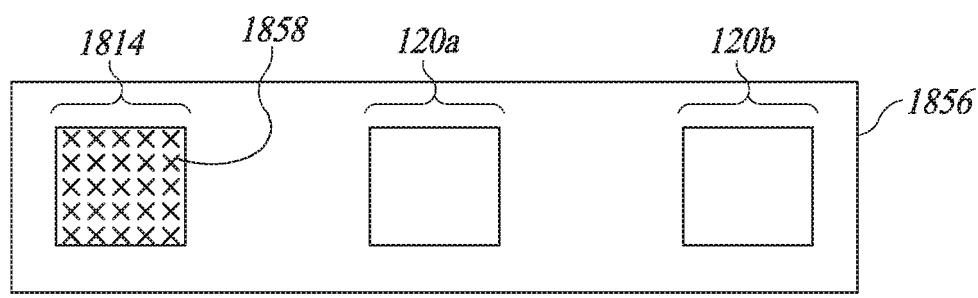
FIG. 18 is a top plan view of an input optic and a number of output optics which may be formed or reside on or in a layer (e.g., optical layer or substrate), according to at least one illustrated embodiment, in which the input optic comprises one or more regions of plasmonic nanostructures.

FIG. 18 shows an input optic 1814 and a number of output optics 120*a*, 120*b* (only two shown) which may be formed or reside on or in a layer 1856 (e.g., optical layer 122 or substrate 112, 612, 1012), according to at least one illustrated embodiment. The input optics 1814 and output optics 120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 1814.

In particular, FIG. 18 illustrates the input optics 1814 as comprising one or more regions of nanostructures in the form of plasmonic nanostructures 1858 (only one called out).

Figure 19:
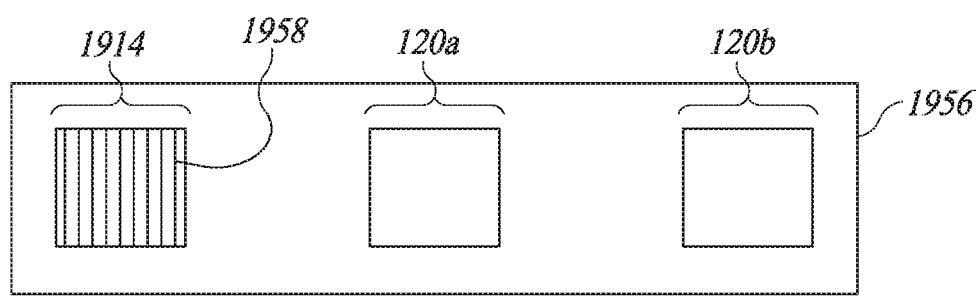
FIG. 19 is a top plan view of an input optic and a number of output optics which may be formed or reside on or in a layer (e.g., optical layer or substrate), according to at least one illustrated embodiment, in which the input optic comprises one or more regions of holographic diffraction grating nanostructures.

FIG. 19 shows an input optic 1914 and a number of output optics 120*a*, 120*b* (only two shown) which may be formed or reside on or in a layer 1956 (e.g., optical layer 122 or substrate 112, 612, 1012), according to at least one illustrated embodiment. The input optics 1914 and output optics 120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 1914.

In particular, FIG. 19 illustrates the input optics 1914 as comprising one or more regions of nanostructures in the form of holographic diffraction grating nanostructures 1958 (only one called out).

Figure 20:
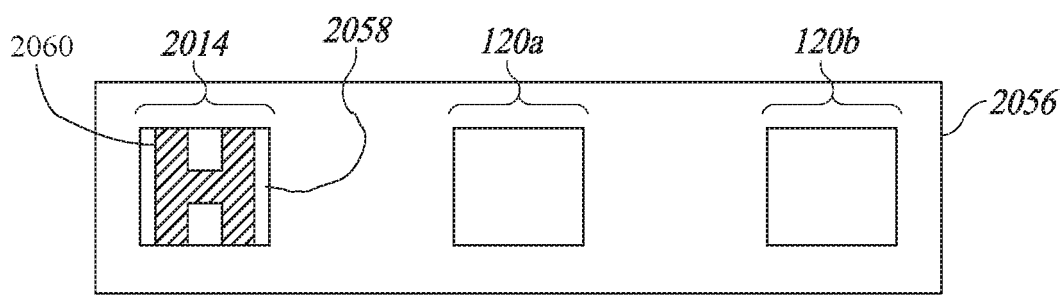
FIG. 20 is a top plan view of an input optic and a number of output optics which may be formed or reside on or in a layer (e.g., optical layer or substrate), according to at least one illustrated embodiment, in which the input optic comprises at least one transparent region and at least one opaque or mask region.

FIG. 20 shows an input optic 2014 and a number of output optics 120*a*, 120*b* (only two shown) which may be formed or reside on or in a layer 2056 (e.g., optical layer 122 or substrate 112, 612, 1012), according to at least one illustrated embodiment. The input optics 2014 and output optics 120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 2014.

In particular, FIG. 20 illustrates the input optics 2014 as comprising one or more transparent elements 2058 (only one called out) and one or more opaque elements or masks 2060.

Figure 21:
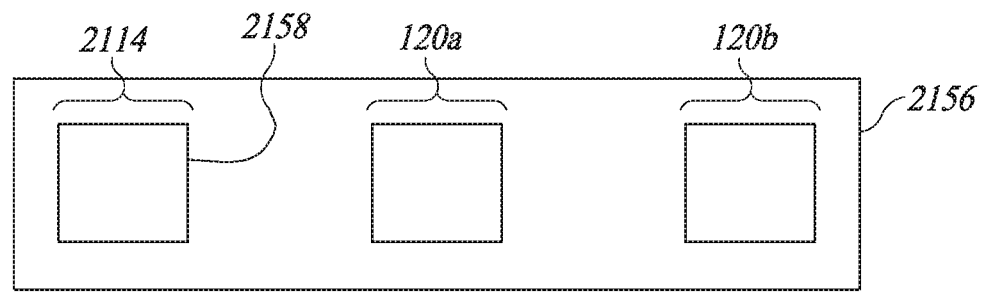
FIG. 21 is a top plan view of an input optic and a number of output optics which may be formed or reside on or in a layer (e.g., optical layer or substrate) having a reflective surface or boundary, according to at least one illustrated embodiment.

FIG. 21 shows an input optic 2114 and a number of output optics 120*a*, 120*b* (only two shown) which may be formed or reside on or in a layer 2156 (e.g., optical layer 122 or substrate 112, 612, 1012), according to at least one illustrated embodiment. The input optics 2114 and output optics 120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 2114.

In particular, FIG. 21 illustrates a dielectric slab or layer 2156 with a reflective surface or boundary 2158 that reflects at least some wavelengths or frequencies of electromagnetic energy, for instance light in the visible, infrared and/or ultraviolet ranges of the electromagnetic spectrum. The reflective surface or boundary 2158 can, for example, be formed or configured to direct incident light, for example redirecting incident light entering a first major face of the substrate, slab or layer 2156 to be intentionally redirected through reflection on a second major face of the substrate, slab or layer 2156, opposed to the first major face.

Figure 22:
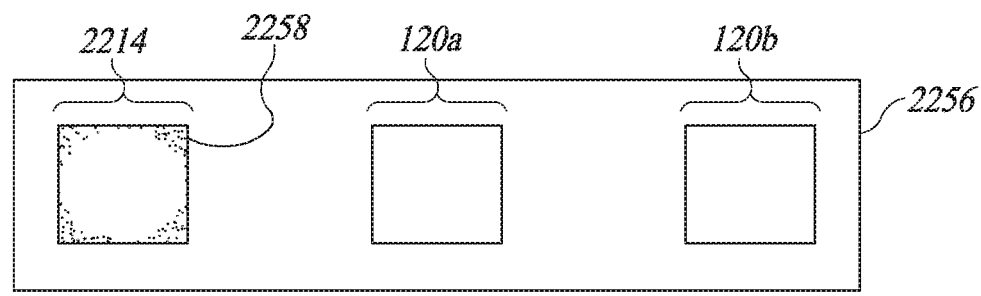
FIG. 22 is a top plan view of an input optic and a number of output optics which may be formed or reside on or in a layer (e.g., optical layer or substrate) having an absorptive surface or boundary, according to at least one illustrated embodiment.

FIG. 22 shows an input optic 2214 and a number of output optics 120*a*, 120*b* (only two shown) which may be formed or reside on or in a layer 2256 (e.g., optical layer 122 or substrate 112, 612, 1012), according to at least one illustrated embodiment. The input optics 2214 and output optics 120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 2214.

In particular, FIG. 22 illustrates a dielectric slab or layer 2256 with an absorptive surface or boundary 2258 that absorbs at least some wavelengths or frequencies of electromagnetic energy, for instance light in the visible, infrared and/or ultraviolet ranges of the electromagnetic spectrum. The absorptive surface or boundary 2258 can, for example, be formed or configured to control or shape incident light. The absorptive surface or boundary 2258 can, for example, be formed or configured to block or reduce the entry of ambient or stray light. The absorptive surface or boundary 2258 can, for example, be formed or configured to absorb scattered and/or unused incident light with the interior 104. Thus, the absorptive surface or boundary 2258 can be on any or all faces of the substrate 2256.

Figure 23:
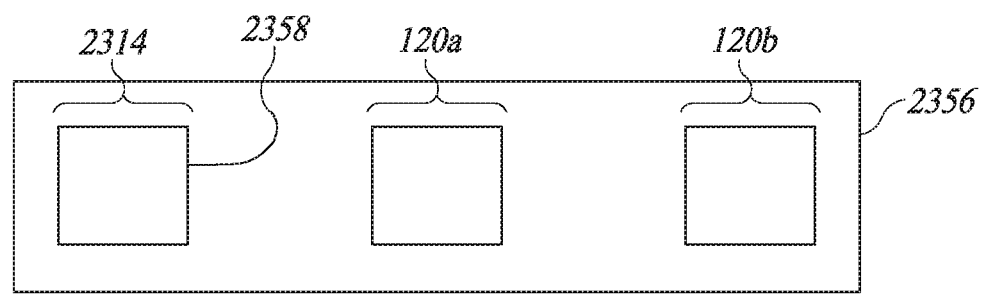
FIG. 23 is a top plan view of an input optic and a number of output optics which may be formed or reside on or in a layer (e.g., optical layer or substrate) having one or more index matched portions, according to at least one illustrated embodiment.

FIG. 23 shows an input optic 2314 and a number of output optics 120*a*, 120*b* (only two shown) which may be formed or reside on or in a layer 2356 (e.g., optical layer 122 or substrate 112, 612, 1012), according to at least one illustrated embodiment. The input optics 2314 and output optics 120*a*, 120*b* may be employed in any of the embodiments of FIG. 1, 4 or 5, or alternatively in any of the embodiments of FIG. 7 or 11 if the output optics 120*a*, 120*b* are on the opposite side of the substrate from the input optic(s) 2314.

In particular, FIG. 23 illustrates a dielectric slab or layer 2356 with one or more index matched surfaces or boundaries 2358 that matches an index of reflection of an adjacent material (e.g., layer in which input and/or output optics are formed, input and/or output optics, air).

Figure 24:
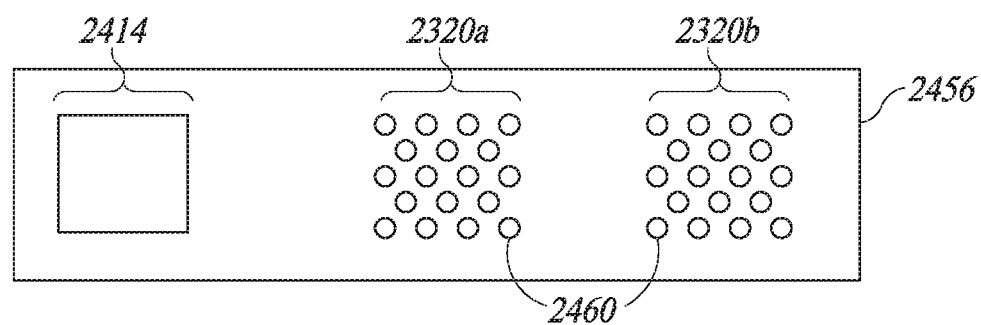
FIG. 24 is a top plan view of an input optic and a number of output optics which may be formed or reside on or in a layer (e.g., optical layer or substrate), according to at least one illustrated embodiment, in which the output optic comprises at least one region of nanocrystal lattice nanostructures.

FIG. 24 shows an input optic 2414 and a number of output optics 2420*a*, 2420*b* (only two shown) which may be formed or reside on or in a layer 2456 (e.g., optical layer 122 or substrate 112, 612, 1012), according to at least one illustrated embodiment. The input optics 2414 and output optics 2420*a*, 2420*b* may be employed in any of the embodiments of FIG. 1, 4 or 5, or alternatively in any of the embodiments of FIG. 7 or 11 if the output optics 2420*a*, 2420*b* are on the opposite side of the substrate from the input optic(s) 2414.

In particular, FIG. 24 illustrates the output optics 2420*a*, 2420*b* as comprising one or more regions of nanocrystal lattice nanostructures 2460 (two called out). The input optic(s) 2414 may take any of the forms described herein, for instance the various forms described in reference to FIGS. 13-20. In some implementations, an aperture may serve as an input optic 114 with, or without, other input optics 114. Additionally, or alternatively the substrate may include one or more surfaces or boundaries that are reflective, absorptive and/or that are index matched, for example as discussed in reference to FIGS. 21-23.

Figure 25:
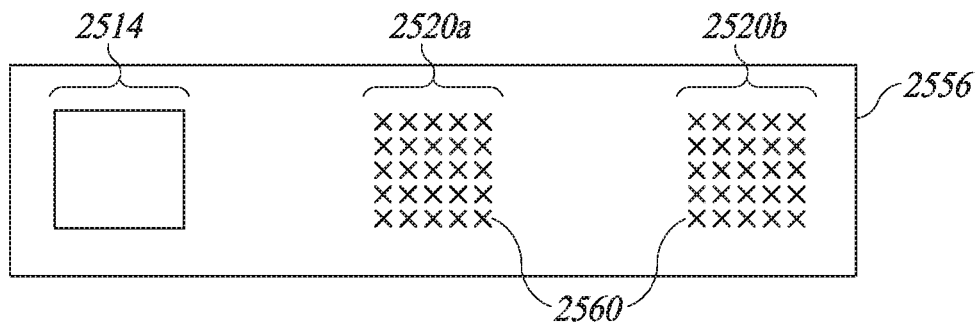
FIG. 25 is a top plan view of an input optic and a number of output optics which may be formed or reside on or in a layer (e.g., optical layer or substrate), according to at least one illustrated embodiment, in which the output optic comprises at least one region of plasmonic nanostructures.

FIG. 25 shows an input optic 2514 and a number of output optics 2520a, 2520b (only two shown) which may be formed or reside on or in a layer 2556 (e.g., optical layer 122 or substrate 112, 612, 1012), according to at least one illustrated embodiment. The input optics 2514 and output optics 2520a, 2520b may be employed in any of the embodiments of FIG. 1, 4 or 5, or alternatively in any of the embodiments of FIG. 7 or 11 if the output optics 2520a, 2520b are on the opposite side of the substrate from the input optic(s) 2514.

In particular, FIG. 25 illustrates the output optics 2520a, 2520b as comprising one or more regions of plasmonic nanostructures 2560 (two called out). The input optic(s) 2414 may take any of the forms described herein, for instance the various forms described in reference to FIGS. 13-20. In some implementations, an aperture may serve as an input optic 114 with, or without, other input optics 114. Additionally, or alternatively the substrate may include one or more surfaces or boundaries that are reflective, absorptive and/or that are index matched, for example as discussed in reference to FIGS. 21-23.

Figure 26:
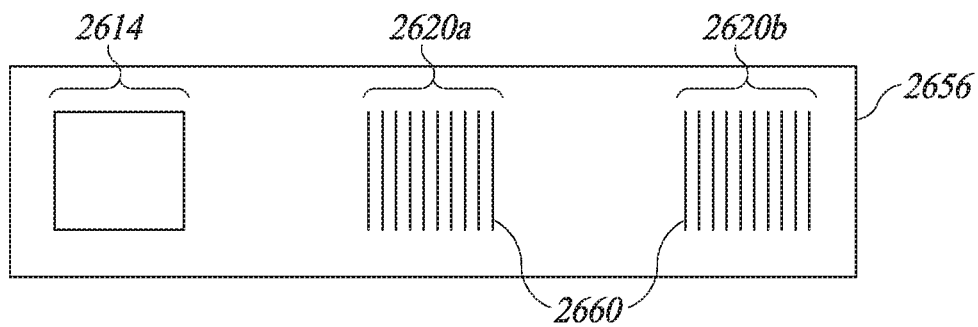
FIG. 26 is a top plan view of an input optic and a number of output optics which may be formed or reside on or in a layer (e.g., optical layer or substrate), according to at least one illustrated embodiment, in which the output optic comprises at least one region of holographic diffraction grating nanostructures.

FIG. 26 shows an input optic 2614 and a number of output optics 2620a, 2620b (only two shown) which may be formed or reside on or in a layer 2656 (e.g., optical layer 122 or substrate 112, 612, 1012), according to at least one illustrated embodiment. The input optics 2614 and output optics 2620a, 2620b may be employed in any of the embodiments of FIG. 1, 4 or 5, or alternatively in any of the embodiments of FIG. 7 or 11 if the output optics 2620a, 2620b are on the opposite side of the substrate from the input optic(s) 2614.

In particular, FIG. 26 illustrates the output optics 2620a, 2620b as comprising one or more regions of holographic diffraction grating nanostructures 2660 (two called out). The input optic(s) 2414 may take any of the forms described herein, for instance the various forms described in reference to FIGS. 13-20. In some implementations, an aperture may serve as an input optic 114 with, or without, other input optics 114. Additionally, or alternatively the substrate may include one or more surfaces or boundaries that are reflective, absorptive and/or that are index matched, for example as discussed in reference to FIGS. 21-23.

Figure 27:
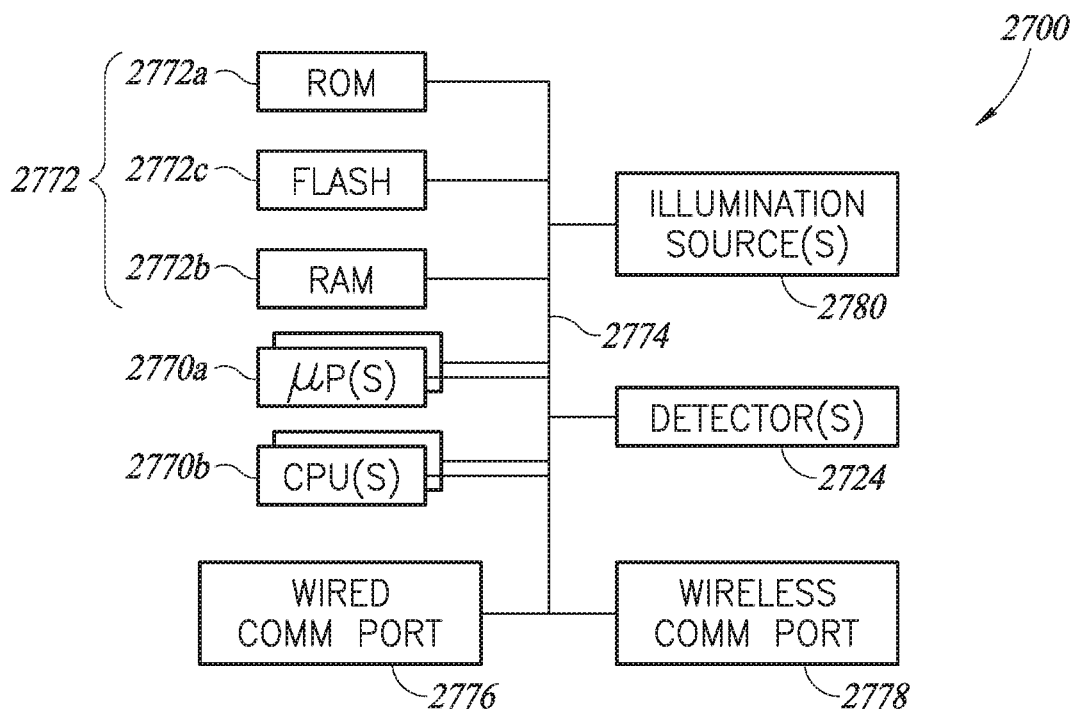
FIG. 27 is a schematic diagram of a system that includes any of the apparatus and/or structures or components described in reference to FIGS. 1-26, according to one illustrated embodiment.

FIG. 27 shows a system 2700, according to at least one illustrated embodiment. The system 2700 may include the apparatus and/or structures or components of any of the embodiments discussed in reference to FIGS. 1-26.

The system may include a processor-based system, for instance a computer 2702, which is communicatively coupled to one or more detectors 2724, for instance the detectors of the various apparatus discussed above.

The computing system 2702 may be integrated into the housing of the apparatus, or may be distinctly separate therefrom, and may even be remotely located from the apparatus and detector(s) 2724. The computing system 2702 is suitable for receiving information from the detector(s) 2724 which indicates information about electromagnetic energy (e.g., light) received by the detector(s) 2724. While not illustrated, there may be one or more intermediary components (e.g., analog-to-digital converters or ADCs) between computing system 2702 and the detector(s) 2724, for example to change raw signals from the detector(s) 2724 into a format suitable for the computing system 2702. The computing system 200 is also suitable for analyzing the information from the detector(s) 2724. The computing system 200 may also be communicatively coupled to control one or more illumination sources 2780, which may illuminate a specimen or sample with electromagnetic energy, which is then provided to the interior of the housing as described above. The article or an apparatus employing the article may include one or more illumination sources, for instance one or more light emitting diodes (LEDs), which can take the form of standard LEDs or organic LEDs, and which an emit in a range of wavelengths (e.g., white light emitting LEDs, IR emitting LEDs, blue emitting LEDs). The illumination source(s) may be integral to article, the housing or apparatus. For example, one or more LED chips or wafers can be mounted to or in the housing, for instance via flip chip bonding, or even formed in situ on the housing 102 (FIG. 1) or substrate 112 (FIG. 1) thereof. The article or apparatus may include one or more conduits aligned to provide a light communicative path from an illumination source (e.g., LED) through or into at least a portion of an interior of the housing. The conduit(s) may contain or include or form one or more apertures, recesses, or one or more other optical structures formed in situ, which spectrally and/or spatially filter the light emanating from the source.

The apparatus with the computing system 2702 may form an analytical instrument, for example a spectrometer. The apparatus may have a relatively small form factor and weight, and in some instances be powered via one or more battery cells, and thus may be portable or even handheld.

The computing system 2702 may include one or more processing units 2770a and 2770b (collectively processing unit 2770), system memory 2772 and a system bus 2774 that couples various system components including the system memory 2772 to the processing units 2770. The processing unit 2770 may be any logic processing unit, such as one or more central processing units (CPUs) 2770a (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Apple A8, Motorola X8), graphical processing units (GPUs) 2770b, digital signal processors (DSP), application-specific integrated circuits (ASICs), field programmable gate arrays (FPGAs), etc. The system bus 2774 can employ any known bus structures or architectures, including a memory bus with memory controller, a peripheral bus, and a local bus. The system memory 2772 includes read-only memory (ROM) 2772a, random access memory (RAM) 2772b, and flash memory 2772c. A basic input/output system (BIOS) can be stored in the ROM 2772a, and contains basic routines that help transfer information between elements within the computing system 2702, such as during start-up. Computer-readable storage media can be used to store the information that may be accessed by processing unit 2770a. For example, such computer-readable storage media may include, but is not limited to, random access memory (RAM), read-only memory (ROM), electrically erasable programmable read-only memory (EEPROM), flash memory, or other solid state memory or any other medium.

The computing system 2702 also may include a plurality of interfaces such as wired network interface or port 2776 and wireless network interface or port 2778 supporting any other wireless/wired protocols. The wireless network interface or port 2778 may include one or more radios (not shown) and associated antennas (not shown). The transceivers or radios can take the form of any device capable of transmitting and receiving communications via electromagnetic energy. For example, the computing system 2702 may include one or more cellular transceivers or radios, one or more WI-FI® transceivers or radios, and one or more BLUETOOTH® transceivers or radios, along with respective associated antennas. Accordingly, the computing system 2702 may be a smart phone or tablet computer that is capable of communicating via cellular, WI-FI®, and BLUETOOTH® and communications.

Non-limiting examples of cellular communications transceivers or radios include a CDMA transceiver, a GSM transceiver, a 3G transceiver, a 4G transceiver, an LTE transceiver, and any similar current or future developed mobile device transceiver having at least one of a voice telephony capability or a graphical data exchange capability. In at least some instances, the cellular transceivers or radios can include more than one interface. For example, in some instances, the cellular transceivers or radios can include at least one dedicated, full- or half-duplex voice call interface and at least one dedicated data interface. In other instances, the cellular transceivers or radios can include at least one integrated interface capable of contemporaneously accommodating both full- or half-duplex voice calls and data transfer.

Non-limiting examples of WI-FI® transceivers or radios include various chipsets available from Broadcom, including BCM43142, BCM4313, BCM94312MC, BCM4312, and WI-FI® chipsets available from Atmel, Marvell, or Redpine. Non-limiting examples of WI-FI® transceivers or radios include various chipsets available from Broadcom, Tex. Instruments and Redpine.

Program modules can be stored in the system memory 2772, such as an operating system (e.g., Linux®, iOS®, Android®, Windows® Phone, Windows® 8, and similar), one or more application programs, other programs or modules, and program data. Application programs may include instructions that cause the processor unit(s) 2770 to generate, process, and/or receive information from the detector(s) 2724, either in raw or preprocessed form, and to analyze the information, for example determining an intensity of light detected at each of a plurality of wavelengths. More particularly, the application programs include instructions that cause the processor unit(s) 2770 to perform one or more of the acts described herein.

Other program modules may include instructions for handling security such as password or other access protection and communications encryption. The system memory 2772 may also include communications programs, for example, a Web client or browser for permitting the computing system 2702 to access and exchange data with sources such as Web sites of the Internet, corporate intranets, extranets, or other networks and devices as described herein, as well as other server applications on server computing systems. The browser may be a markup language based browser, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

An operator can enter commands and information into the computing system 2702 through input devices such as a touch screen (not shown), and/or via a graphical user interface. Other input devices can include a microphone, a pointing device, etc. These and other input devices, such as camera unit, are connected to one or more of the processing units 2770 through the bus 2774 or the interface or port 2776, 2778, such as a serial port interface or universal serial bus (USB) port that is coupled to the system bus 2774, although other interfaces such as a parallel port, a game port or a wireless interface can be used. The touch screen device or other display device is coupled to the system bus 2774 via a video interface (not shown), such as a video adapter.

The computing system 2702 can operate in a networked environment using logical connections to one or more remote computers and/or devices. For example, the computing system 2702 can operate in a networked environment using logical connections to one or more cellular networks, mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

A method of forming or fabricating an apparatus may include a variety of acts.

For example, the method may include forming an substrate that is transmissive of electromagnetic energy of at least a plurality of wavelengths, the substrate having a first end, a second end, a first major face, a second major face, at least one edge, a length, a width, and a thickness, the second end opposed to the first end across the length of the substrate, the second major face opposed across the thickness of the substrate from the first major face, the at least one edge which extends between at least a portion of the first major face and a portion of the second major face, the width of the substrate greater than the thickness of the substrate.

The method may further include forming at least a first nanostructure that selectively extracts electromagnetic energy of a first set of wavelengths from the substrate.

The method may further include orienting and positioning an input optic to provide electromagnetic energy into the substrate via at least one of the first or the second major face of the substrate.

The method may optionally further include positioning a light sensor to receive light extracted from the substrate at least by the first nanostructure and/or by a second nanostructure.

Forming the first nanostructure can include forming at least one of a first photonic crystal lattice or a plasmonic structure in a dielectric that overlies the first major face of the substrate. Forming the first nanostructure can include at least one of patterning, direct molding, or casting the first nanostructure in a dielectric that comprises the substrate.

Forming a first nanostructure can include forming a first nanostructure that selectively extracts electromagnetic energy of the first set of wavelengths from the substrate via the first major face of the substrate, and the method can further comprise forming a second nanostructure that selectively extracts electromagnetic energy of a second set of wavelengths from the substrate via the first major face of the substrate, the second set of wavelengths different from the first set of wavelengths.

Forming a first nanostructure can include forming a one-dimensional, two-dimensional, or a three-dimensional nanostructure. Forming a first nanostructure can include forming the first nanostructure on a same one of the first or the second major face of the substrate as the input optic. Forming a first nanostructure can include forming the first nanostructure on an opposite one of the first or the second major face from the substrate. Forming a first nanostructure can include forming the first nanostructure spaced along the length of the substrate from the input optic. Forming the input optic can include forming a second nanostructure, the second nanostructure different than the first nanostructure. Forming a first nanostructure can include forming a holographic diffraction grating, a photonic crystal lattice structure or a plasmonic structure.

Orienting and positioning an input optic can include orienting and positioning the input optic to provide electromagnetic energy into the substrate in an area on the first or the second major face of the substrate which is greater than an area of at least one of the edges of the substrate.

Orienting and positioning an input optic can include forming at least one of a focusing lens, an array of focusing lenses, a prism, an array of prisms, a mirror, an array of mirrors, a reflector, a reflective surface, a reflective boundary, a refractive boundary, and another nanostructure.

Orienting and positioning an input optic can include physically directly coupling the input optic with one of the first or the second major face of the substrate.

Orienting and positioning an input optic can include physically directly coupling the input optic with one of the first or the second major face of the substrate via an optical adhesive or an optical epoxy.

Orienting and positioning an input optic can include orienting and positioning the input optic to input light to the substrate via the first major face of the substrate, and positioning a sensor includes positioning the sensor to receive light exiting the substrate via the second major face of the substrate. Orienting and positioning an input optic can include orienting and positioning the input optic to input light to the substrate via the first major face of the substrate and positioning a sensor includes positioning the sensor to receive light exiting the substrate via the first major face of the substrate.

The method may further include providing an opaque housing having a conduit with or without at least one recess positioned along a length of the conduit, and housing the substrate, the first nanostructure, the input optic and the sensor in at least one cavity of an opaque housing. The method may further include providing the opaque housing with at least one beveled edge in the cavity, the at least one beveled edge which extends along at least a portion of the at least one edge of the substrate, at a non-perpendicular angle with respect to the at least one edge of the substrate. The method may further include providing the opaque housing having a first and a second cavity and at least one aperture that provides a light communicative path between the first and the second cavities, and the substrate and the first photonic crystal lattice are housed in the first cavity and the sensor housed is housed in the second cavity.

The method may further include integrally coupling the substrate with the sensor as a cover glass for the sensor.

The method may further optionally include forming a mask over at least a portion of the first nanostructure.

The method may further optionally include polishing at least one of the first or the second major surfaces of a substrate. The method may further optionally include polishing at least one of the first or the second major surfaces of a substrate without polishing one or more edges of the substrate.

EXAMPLES

In an example, one or more of arrays of periodic nanostructure features in the regions 132a-132c (FIGS. 1-3) can be formed, imprinted, or otherwise patterned on the substrate or slab 112 itself, or the arrays of periodic nanostructure features can be separately fabricated, for instance in a distinct layer 128, and mechanically and optically coupled to a major face 118 of the substrate 112. In an example, the periodic nanostructure feature array or lattice pattern can be formed via imprint, electron-beam lithography or using another patterning technique (e.g., a photonic patterning technique such as two-photon lithography, among others).

For example, a two-dimensional array pattern of periodic nanostructure features can be formed, such as in a transparent medium on or in a transparent substrate 112. In an example, the two-dimensional array pattern of periodic nanostructure features can be used to selectively in-couple incident electromagnetic energy 116 (e.g., optical electromagnetic energy or light) and/or out-couple specific wavelengths or ranges of wavelength (e.g., ultraviolet, visible, or infrared light, among others) of electromagnetic energy 121a, 121b (e.g., optical electromagnetic energy or light). The incident electromagnetic energy 110 can be transmitted or propagated (i.e., waveguided) through the substrate 112 when provided to a major face 118 of the substrate 112 via an input optic 114 (e.g., focused on or coupled to at least a portion of the major face 118 of the substrate 112). Similarly, in an example, a three-dimensional array pattern of periodic nanostructure features can be formed, such as by laminating or bonding a series of separately-fabricated two-dimensional arrays, among other techniques formed on distinct layers.

In a photonic crystal, a periodic potential formed by spatial variation in the relative permittivity "E/" of a medium interacts with electromagnetic energy resulting in partial or complete photonic bandgaps. The band structure can be determined by one or more physical properties such as: the choice of lattice, the basis formed by the shape and size of the holes (or bars, since an effective permittivity contrast or variation is desired), the thickness of a patterned layer, or the contrast in the spatial variation of the permittivity, "Er." The energy scale for the band structure can be determined by a lattice constant and the permittivity (or index of refraction).

In an example, the photonic crystal pattern can include a two-dimensional square lattice of circular cavities penetrating into the dielectric material of the photonic crystal from a first working surface, or one or more other patterns. Other patterns can include one or more patterns including higher orders of symmetry than a square lattice, or one or more patterns symmetric with respect to the input (e.g., to provide a more equal or predictable path for extracted light, to preserve a desired polarization, or to alter the photonic band structure, among others). For example, the periodicity of the array can be described by a lattice constant describing the spacing between adjacent like lattice site regions in the periodic lattice, such as for example a first lattice constant "a" corresponding to the second region 120b, and a second lattice constant "b" corresponding to the third region 120c. The lattice constant can determine the wavelength or wavelengths of electromagnetic in-coupling and/or out-coupling, such as to extract a first range of wavelengths using the second region 120b of the photonic crystal. Similarly, a second range of wavelengths can be extracted using a third region 120c of the photonic crystal. In an example, one or more of the second region 120b or the third region 120c can be used to extract more than one range of wavelengths, such as using a superperiodic lattice structure, or including one or more harmonics of the frequency corresponding to the specified first or second lattice constants, "a" or "b." Alternatively or additionally, the article can include fourth or more regions, each region having physical characteristics for extracting a respective range of wavelengths.

When the incident optical energy is coupled into the substrate 112, for example a dielectric waveguide, a periodic transverse potential can exist in proximity to the perimeter of the substrate 112, such as within or even slightly beyond a cladding material surrounding the waveguide (or air, if the waveguide is not clad). The transverse component of the wavevector corresponding to the optical energy propagating through the waveguide can be scattered by a reciprocal lattice vector provided by the photonic crystal or other nanostructure array or lattice, allowing the photonic crystal or other nanostructure array or lattice to extract a desired portion of the optical energy from the substrate (e.g., waveguide) within a specified (e.g., desired) range of wavelengths, determined at least in part by the lattice constant. In an example, the basis and the index of refraction of the material in which the photonic crystal pattern is formed can determine the strength of this wavelength-selective out-coupling, such as when the crystal pattern presents a contrasting effective permittivity as compared to other regions surrounding the waveguide or substrate 112.

A complete photonic bandgap can be avoided in the ranges of wavelengths of interest, such as to avoid entirely disrupting transmission in the substrate (e.g., propagation within the waveguide) 112, or to avoid strongly coupling guided modes out of the waveguide. Instead, a partial bandgap can be provided, such as by adjusting one or more of a depth or fill factor of individual cavities, bars, or apertures that can be included in the periodic array, or by adjusting a lattice pattern (e.g., using a hexagonal pattern, a square pattern, or one or more patterns), such as in the second or third regions 120b, 120c, resulting in weak coupling (e.g., "leaky mode coupling") of the optical energy in the desired ranges of wavelengths provided by the second and third regions 120b, 120c of the periodic nanostructure arrays or lattices. For example, the photonic crystal can be made thin with respect to a thickness of the substrate 112, such as to perturb a boundary field distribution around the substrate (e.g., waveguide). For a square lattice of round cavities, the fill factor can be represented as "r/a," where "r" is the radius of a round cavity that can be included in the array, and "a" is the lattice constant. In this way, an array of patterns can be used to create spatially-resolved wavelength-selective out-coupling, which can then be directed toward an optical detector 124. One or more of the substrate 112 or nanostructure arrays or lattice can be made of polycarbonate, poly (methyl methacrylate) ("PMMA"), epoxy, glass, quartz, or fused silica, among other materials.

In an example, the optical detector 124 can include an optical imaging detector positioned and oriented to receive information indicative of one or more of wavelength, position, or intensity of electromagnetic energy, such as coupled to the second and third regions 120b, 120c via a coupling layer 125a and/or optical fibers 125b. As previously noted, the detector(s) 124 can include one or more of a charge-coupled device ("CCD"), a complementary-metal-oxide-semiconductor ("CMOS") image detector or sensor or transducer, or one or more other detectors. As similarly discussed above, incident electromagnetic energy can be focused or provided to a major face 118 of the substrate 112 via input optic(s) 114 at a first region 120a. Electromagnetic energy (e.g., light) corresponding to a first range of wavelengths can be extracted via a first array or lattice of periodic nanostructure features (e.g., photonic crystal) with a first set of defined physical characteristics located at a second region 120b (e.g., photonic crystal), such as provided by or on a first working surface of the substrate 112 or layer 112 physically coupled to the first working surface of the substrate 112. Similarly, electromagnetic energy (e.g., light) corresponding to a second range of wavelengths can be extracted via a second array or lattice of periodic nanostructure features (e.g., photonic crystal) with a second set of defined physical characteristics, different than the first set of defined physical characteristics, located at a third region 120c, such as provided by or on the first working surface of the substrate 112 or nanostructure array layer 122 physically coupled to the first working surface of the substrate 112.

Also for example, the nanostructure array(s) pattern can be imprinted or otherwise included on a portion of the substrate 112 material itself, or provided on or in another layer 122.

In an example, the coupling layer 125a and/or optical fibers 125b can include one or more features to provide a specified numerical aperture with respect to incident electromagnetic energy coupled from the array or lattice of periodic nanostructure features to the coupling layer 125a and/or optical fibers 125b. The numerical aperture, "NA," can be represented as "n sin θ," where n represents an index of refraction of the coupling layer 125a and/or optical fibers 125b, and θ represents an exemplary angle of incidence with respect to a line normal to input.

Not all electromagnetic energy scattered by the array or lattice of periodic nanostructure features can be received by the detector 124. A response function (e.g., a detected intensity distribution with respect to wavelength) corresponding to a particular detected region of the array or lattice of periodic nanostructure features (e.g., the second or third regions 12b, 120c) can be determined in part by the numerical aperture at the interface between the array or lattice of periodic nanostructure features and the detector 124. Thus, the coupling layer 125a and/or optical fibers 125b can provide a desired NA to shape the resulting response function for a particular application. If a very narrow range of wavelengths are of interest (e.g., a particular emission line, or a particular one or more individual wavelengths), a narrow aperture can be used to provide a sharp peak in the response function at the desired wavelength to be detected. Similarly, if a broad spectrum is to be measured, a broader range of overlapping response functions can be used, such as to provide desired coverage of a wide range of frequencies using a reasonable number of detection cells or regions of the array or lattice of periodic nanostructure features.

In an example, a two- or three-dimensional array of nanostructure features can be formed on or near a second working surface of the nanostructure array layer 122, such as when the nanostructure features are fabricated prior to assembly with the substrate 112. In this example, a third region can extract optical energy including a specified range of wavelengths from the substrate 112. In this manner, an area density of the nanostructure features can be increased since both sides of the layer 122 can be used for extraction of optical energy from the substrate 112. In an example, the detector 124 can be coupled (e.g., physically and/or optically coupled) to a micro-lens array, to focus selected or specified elements (e.g., pixels) of the detector 124 respectively on or near the first working surface of the layer 122, or the second working surface of the layer 122.

In an example, one or more of a non-linear optical region, a phosphor, a fluorophore, a charge-discharge material, an organic dye, an organic crystal, or a quantum dot region can be used to filter or convert electromagnetic energy (e.g., light) from a first range of wavelengths to a second range of wavelengths. For example, in an implementation that includes patterns of nanostructures on both the first and second working surfaces of the layer 122, electromagnetic energy extracted from the first working surface can be converted to a first range of wavelengths such as using a second conversion region. In this example, a third conversion region can be used to convert electromagnetic energy extracted by pattern in the third region to a second range of wavelengths. In this manner, the detector 124 can discriminate between optical energy extracted by the patterns on the first working surface, and the energy extracted by the patterns on the second working surface, using wavelength-based discrimination. For example, since the frequency content of the incident energy has been spatially resolved across the array, the location of detected energy can be used to determine respective wavelengths included in the incident energy, and the wavelength of detected energy (e.g., provided after conversion) can be used to determine whether the first working surface or the second working surface provided the detected energy.

In an example, the incident electromagnetic energy to be analyzed can include electromagnetic energy (e.g., optical energy) at the edge of or outside a range of wavelengths detectable by the optical detector 124. For example, when the optical detector 124 includes a CCD, such devices are usually sensitive to a range of free-space wavelengths from around 400 nanometers to around 1100 nanometers. Thus, if the incident optical energy includes ultraviolet ("UV") energy, such as in the range of 300-400 nanometers, such energy may not be detectable by the CCD (e.g., a silicon CCD). As discussed above, since the wavelength information about the incident energy is encoded spatially across the nanostructure array, the incident non-detectable energy can be down-converted to a more easily detectable range of wavelengths. For example, the coupling layer 122a or coupling optical fibers 122b can include a relatively uniform conversion material across the top working surface of the layer 122 (e.g., charge-discharge material). In a charge-discharge material example, the conversion material can be excited to achieve a desired population inversion, and then incident electromagnetic energy can be provided to selectively discharge (e.g., deactivate) portions of the charge-discharge material above regions in the nanostructure array (s) corresponding to various ranges of wavelengths extracted from the incident electromagnetic energy, resulting in detectable secondary emission at a lower frequency (e.g., a longer wavelength). Even though the emitted light from the first working surface can be almost monochromatic after down conversion, the wavelengths of the incident electromagnetic energy can still be determined using the position of the detected optical energy, as above.

In an illustrative example, such techniques can be used to perform spectral or photometric analysis on the emissions of UV sources, such as an UV LED, a plasma, or one or more other sources, using an inexpensive silicon CCD as the optical detector 124. For example, quartz optics can be used if UV energy is to be coupled into the substrate 112, and extracted via the nanostructure array(s), since quartz can provide acceptable transmission characteristics at UV frequencies.

In an example, certain frequencies of interest that can be included in the incident electromagnetic energy may be too low to be reliably detected (e.g., having too long a wavelength, or outside the bandgap of a semiconductor optical detector). In such examples, a non-linear optical material, among others, can provide a frequency doubling (e.g., second harmonic coupling) effect to up-convert the incident electromagnetic energy to a detectable range of wavelengths, such as before coupling into the substrate 112, or after extraction by the output optics (e.g., array(s) of nanostructures). Such frequency doubling or other up conversion can be used, for example, to move mid-infrared frequencies into a range of wavelengths detectable by a silicon CCD, among others (e.g., after extraction via the array(s) of nanostructures and using a non-linear optical material, a phosphor, a fluorophore, or other material in one or more conversion regions).

In an example, a processor-based system, for instance a computer 2702, can be electrically or optically coupled to the detector(s) 124, to receive information representative of the electromagnetic energy detected, sensed or measured by the detector(s) 124. The information can be indicative of one or more of the position, intensity, or wavelength of electromagnetic energy detected by the detector 124. In an example, the computer 2702 can execute instructions that cause the computer 2702 to provide an estimate of the spectrum of the incident electromagnetic energy at least in part using the information provided by the detector(s) 124, such as one or more spectral estimates. Alternatively, an analog or digital circuit can perform the analysis and/or preprocessing of information from the detector(s) 124.

As discussed above, the input optic 114 can take any of a variety of forms, and may, for example, include one or more of a prismatic portion 1458 (FIG. 14), or a mirror or reflector 1358 (FIG. 13) (e.g., a prismatic mirror or other reflecting structure), positioned and oriented to bend incident electromagnetic energy from an incident plane into an input plane (i.e., major face 118) of the substrate 112. In example, the input optic(s) 114 can couple electromagnetic energy incident less than or equal to a specified angle, such as "8," with respect a line normal to the input plane of the prism. In an example, other optical components can be used as input optics 114, for instance to focus or otherwise direct electromagnetic energy toward or onto the input of the prism(s) 1458, such that a portion of the incident electromagnetic energy will bend and either transmit through the substrate 112 or propagate through the substrate 112 by total internal reflection if the substrate 112 is implemented as a waveguide. In this manner, certain dimensions of the apparatus 100 can be further reduced in size as compared to apparatus lacking an input structure configured to bend the incident electromagnetic energy.

In an example, the coupling layer 125a or optical fibers 125b can include one or more features such as shown or discussed above (e.g., filtering, up converting, or down converting features, among others). The coupling layer 125a or optical fibers 125b can include one or more features to provide a specified numerical aperture, as discussed above, for incident out-coupled energy from a first working surface of the coupling layer 125a adjacent or in proximity to the nanostructure array or lattice. In an illustrative example, a coupling layer 125a comprises optically opaque coatings, for example on or near a first working surface (i.e., surface of coupling layer 125a adjacent or proximate nanostructure array or lattice), and a second working surface (i.e., surface of coupling layer 125a spaced from nanostructure array or lattice with respect to first working surface). For example, the optically opaque coatings can be opaque to optical energy coupled toward the optical detector 124 from the second and third regions 132b, 132c. The first and second coatings can include an array of apertures or etched portions such that optical energy can be transmitted through the coupling layer 125a when incident within a specified range of angles with respect to the coupling layer 125a. Such aperture control can be used to adjust the shape of one or more response functions such as associated with one or more patterned regions 132b, 132c of the nanostructure array layer(s) 122. In another illustrative example, the coupling layer 125a can include one or more of a microchannel plate or a fiber bundle 125b. Such a fiber bundle 125b can include one or more fused or clad fiber optic bundles or plates such as provided by Schott AG, Germany. The fiber bundle 125b or microchannel plate can include an array of aligned fiber-optic or waveguiding elements configured to provide a specified numerical aperture (e.g., to couple light incident within a specified range of angles between the one or more of the regions 132b, 132c and the detector 124). Such a plate or bundle can eliminate a need to focus the detector 124 on the regions 132b, 132c, thus potentially allowing reduction of the z-height of the apparatus 300 as compared to an approach using focusing optics between the detector 124 and the regions 132b, 132c. One or more of the structures can be fabricated simultaneously (e.g., molded, patterned, imprinted or the like).

In an example, the coupling layer 125a and/or optical fibers 125b can include one or more features such as shown or discussed above (e.g., filtering, up converting, or down converting features, among others). The coupling layer 125a and/or optical fibers 125b can include one or more features to provide a specified numerical aperture, as discussed above, for incident out-coupled electromagnetic energy from a first working surface of the coupling layer 125a. For example, a coupling layer 125a may comprise optically opaque coatings such as on or near the first working surface, and/or a second working surface, for instance in registration or alignment with one or more regions 132a-132b. The optically opaque coatings can, for example, be opaque to optical energy coupled in toward the substrate 112 or out toward the optical detector 124 from the substrate 112. The first and second coatings can be separately fabricated out of similar or different materials from one another, and assembled (e.g., glued, pressed, laminated, cemented, or otherwise coupled optically and mechanically using one or more techniques).

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. U.S. Pat. No. 8,854, 624; U.S. provisional patent application No. 62/234,315, filed Sep. 29, 2015; and U.S. application Ser. No. 15/764, 692, filed Mar. 29, 2018, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
a substrate that is transmissive of electromagnetic energy of at least a plurality of wavelengths, the substrate having a length, a thickness, a width that is greater than the thickness, a first end, a second end opposed to the first end across the length, a first major face, a second major face opposed to the second major face across the thickness, and at least one edge that extends between at least a portion of the first major face and a portion of the second major face;
at least a first nanostructure that selectively extracts electromagnetic energy of a first set of wavelengths from the substrate via one of the first major face and the second major face;
at least a second nanostructure that selectively extracts electromagnetic energy of a second set of wavelengths from the substrate via one of the first major face and the second major face, and the second set of wavelengths is different than the first set of wavelengths; and
an input optic oriented and positioned to provide electromagnetic energy into the substrate via the first major face, wherein the input optic is transmissive of electromagnetic energy, which enters the input optic through a first surface of the input optic at an angle greater than or equal to a critical angle of the input optic, and exits through a second surface of the input optic without total internal reflection therein, and the first surface is opposite and faces away from the second surface.

2. The apparatus of claim 1 wherein the at least a first nanostructure selectively extracts electromagnetic energy of the first set of wavelengths from the substrate via the first major face.

3. The apparatus of claim 2 wherein the first major face is a planar, optically polished surface.

4. The apparatus of claim 2 wherein the at least a second nanostructure selectively extracts electromagnetic energy of the second set of wavelengths from the substrate via the first major face of the substrate.

5. The apparatus of claim 4 wherein the first major face is a planar, optically polished surface.

6. The apparatus of claim 1 wherein at least one of the first major face and the second major face is a planar, optically polished surface.

7. The apparatus of claim 6 wherein the at least one of the first major face and the second major face which is a planar, optically polished surface is optically polished to a greater degree than the at least one edge.

8. The apparatus of claim 6 wherein the first major face is parallel to the second major face.

9. The apparatus of claim 6 wherein the at least one of the first major face and the second major face which is a planar, optically polished surface is angularly offset with respect to the first end, the second end, and the at least one edge.

10. A method of fabricating an apparatus, the method comprising:
forming a substrate that is transmissive of electromagnetic energy of at least a plurality of wavelengths, the substrate having a length, a thickness, a width that is greater than the thickness, a first end, a second end opposed to the first end across the length, a first major face, a second major face opposed to the second major face across the thickness, and at least one edge that extends between at least a portion of the first major face and a portion of the second major face;
forming a first nanostructure that selectively extracts electromagnetic energy of a first set of wavelengths;
positioning the first nanostructure such that the first nanostructure is supported by one of the first major face and the second major face;
forming a second nanostructure that selectively extracts electromagnetic energy of a second set of wavelengths, wherein the second set of wavelengths is different than the first set of wavelengths;
positioning the second nanostructure such that second nanostructure is supported by one of the first major face and the second major face, and
orienting and positioning an input optic to provide electromagnetic energy into the substrate via the first major face, wherein the input optic is transmissive of electromagnetic energy, which enters the input optic through a first surface of the input optic at an angle greater than or equal to a critical angle of the input optic, and exits through a second surface of the input optic without total internal reflection therein, and the first surface is opposite and faces away from the second surface.

11. The method of claim 10, further comprising:
optically polishing the first major face.

12. The method of claim 10, further comprising:
positioning the first nanostructure such that the first nanostructure is supported by the first major face; and
positioning the second nanostructure such that the second nanostructure is supported by the first major face.

13. The method of claim 10, further comprising:
positioning the first nanostructure such that the first nanostructure is supported by the second major face; and
positioning the second nanostructure such that the second nanostructure is supported by the second major face.

14. An apparatus comprising:
a substrate that is transmissive of electromagnetic energy of at least a plurality of wavelengths, the substrate having a length, a thickness, a width that is greater than the thickness, a first end, a second end opposed to the first end across the length, a first major face, a second major face opposed to the second major face across the thickness, and at least one edge that extends between at least a portion of the first major face and a portion of the second major face, wherein at least one of the first major face and the second major face is a planar, optically polished surface;
at least a first nanostructure supported by one of the first major face and the second major face such that the at least a first nanostructure selectively extracts electromagnetic energy of a first set of wavelengths from the substrate via the one of the first major face and the second major face;
an input optic oriented and positioned to provide electromagnetic energy into the substrate via the first major face, wherein the input optic is transmissive of electromagnetic energy, which enters the input optic through a first surface of the input optic at an angle greater than or equal to a critical angle of the input optic, and exits through a second surface of the input optic without total internal reflection therein, and the first surface is opposite and faces away from the second surface.

15. The apparatus of claim 14 wherein the at least a first nanostructure selectively extracts electromagnetic energy of the first set of wavelengths from the substrate via the first major face.

16. The apparatus of claim 15 wherein the first major face is a planar, optically polished surface.

17. The apparatus of claim 14 wherein the at least a first nanostructure selectively extracts electromagnetic energy of the first set of wavelengths from the substrate via the second major face.

18. The apparatus of claim 17 wherein the second major face is a planar, optically polished surface.

19. The apparatus of claim 14 wherein the at least one of the first major face and the second major face which is a planar, optically polished surface is optically polished to a greater degree than the at least one edge.

20. The apparatus of claim 14 wherein the first major face is parallel to the second major face.

21. A method of fabricating an apparatus, the method comprising:
forming a substrate that is transmissive of electromagnetic energy of at least a plurality of wavelengths, the substrate having a length, a thickness, a width that is greater than the thickness, a first end, a second end opposed to the first end across the length, a first major face, a second major face opposed to the second major face across the thickness, and at least one edge that extends between at least a portion of the first major face and a portion of the second major face;
forming a first nanostructure that selectively extracts electromagnetic energy of a first set of wavelengths;
positioning the first nanostructure such that the first nanostructure is supported by one of the first major face and the second major face;
orienting and positioning an input optic to provide electromagnetic energy into the substrate via the first major face, wherein the input optic is transmissive of electromagnetic energy, which enters the input optic through a first surface of the input optic at an angle greater than or equal to a critical angle of the input optic, and exits through a second surface of the input optic without total internal reflection therein, and the first surface is opposite and faces away from the second surface; and
optically polishing the first major face to a degree greater than the at least one edge.

* * * * *